(12) United States Patent
Sotelo et al.

(10) Patent No.: US 9,067,743 B1
(45) Date of Patent: Jun. 30, 2015

(54) HIGH EFFICIENCY SORTING CONVEYOR

(71) Applicant: Mantissa Corporation, Charlotte, NC (US)

(72) Inventors: Gonzalo Sotelo, Charlotte, NC (US); David Patrick Erceg, Concord, NC (US); J. David Fortenbery, Charlotte, NC (US)

(73) Assignee: Mantissa Corporation, Charlotte, NC (US)

( * ) Notice: Subject to any disclaimer, the term of this patent is extended or adjusted under 35 U.S.C. 154(b) by 0 days.

(21) Appl. No.: 14/336,811

(22) Filed: Jul. 21, 2014

Related U.S. Application Data

(62) Division of application No. 13/429,637, filed on Mar. 26, 2012, now Pat. No. 8,851,267.

(51) Int. Cl.
| | |
|---|---|
| *B65G 47/96* | (2006.01) |
| *B65G 47/38* | (2006.01) |
| *B65G 17/12* | (2006.01) |
| *B65G 23/04* | (2006.01) |

(52) U.S. Cl.
CPC .............. *B65G 47/962* (2013.01); *B65G 47/38* (2013.01); *B65G 17/12* (2013.01); *B65G 23/04* (2013.01)

(58) Field of Classification Search
CPC .. B65G 17/065; B65G 17/066; B65G 17/067; B65G 17/068; B65G 17/12; B65G 23/04; B65G 23/32; B65G 23/36; B65G 35/06; B65G 47/96; B65G 47/962; B65G 47/965
See application file for complete search history.

(56) References Cited

U.S. PATENT DOCUMENTS

| | | |
|---|---|---|
| 3,034,665 A | 5/1962 | Speaker |
| 3,119,488 A | 1/1964 | Rabinow et al. |
| 3,167,192 A | 1/1965 | Harrison et al. |
| 3,211,279 A | 10/1965 | Smith |
| 3,233,720 A | 2/1966 | Atanasoff et al. |
| 3,265,190 A | 8/1966 | Boehm |
| 3,270,860 A | 9/1966 | Siebach |
| 3,510,014 A | 5/1970 | Speaker et al. |
| 3,577,928 A | 5/1971 | Victerri et al. ......... 104/148 LM |
| 3,630,394 A | 12/1971 | Kingzett ..................... 214/62 A |

(Continued)

OTHER PUBLICATIONS

"Progress Reports, VDI, Row 13", German text, vol. 1998 vol. 47, pp. 16-51.

(Continued)

*Primary Examiner* — Gene Crawford
*Assistant Examiner* — Keith R Campbell
(74) *Attorney, Agent, or Firm* — MacCord Mason PLLC

(57) ABSTRACT

A sorting conveyor for transporting objects and unloading objects at one or more unloading stations adjacent the conveyor. The sorting conveyor includes a conveyor track, a train of conveyor carts connected end-to-end, and an opposed roller motor assembly. The opposed roller motor assembly may include a motor; a support frame attached to the conveyor track for supporting the motor; and a pair of cantilevered, drive rollers connected to the motor and to one pivot block assembly and another pivot block assembly adapted for positioning the drive roller adjacent to one surface of an extended fin driven member. The pivot block assemblies may be coupled together with a self-tensioning adjustment assembly. In some examples, the self-tensioning adjustment assembly may be adapted so that movement of each pivot block assembly mirrors movement of the other pivot block assembly.

28 Claims, 23 Drawing Sheets

(56) References Cited

U.S. PATENT DOCUMENTS

| | | | | |
|---|---|---|---|---|
| 3,669,245 A | 6/1972 | Wooten et al. | | 198/155 |
| 3,749,025 A | 7/1973 | Giraud | | 104/25 |
| 3,788,447 A | 1/1974 | Stephanoff | | 193/41 |
| 3,834,316 A | 9/1974 | Hennings | | 104/148 LM |
| 3,848,728 A | 11/1974 | Leibrick et al. | | 198/155 |
| 3,881,609 A | 5/1975 | Ellis et al. | | 214/11 R |
| 3,910,406 A | 10/1975 | Pulver et al. | | 198/189 |
| 3,945,485 A | 3/1976 | Speaker | | 198/155 |
| 3,974,909 A | 8/1976 | Johnson | | 198/155 |
| 3,977,513 A | 8/1976 | Rushforth | | 198/38 |
| 4,004,681 A | 1/1977 | Clewett et al. | | 198/796 |
| 4,031,998 A | 6/1977 | Suzuki et al. | | 198/365 |
| 4,102,448 A | 7/1978 | Wolbrink et al. | | 198/365 |
| 4,174,773 A | 11/1979 | Venzke | | 198/365 |
| 4,197,933 A | 4/1980 | Dunstan et al. | | 198/334 |
| 4,413,721 A | 11/1983 | Bollier | | 198/365 |
| 4,512,710 A | 4/1985 | Flatau | | 414/735 |
| 4,635,785 A | 1/1987 | Prydtz | | 198/365 |
| 4,669,388 A | 6/1987 | Dehne et al. | | 104/162 |
| 4,726,464 A | 2/1988 | Canziani | | 198/365 |
| 4,744,454 A | 5/1988 | Polling | | 198/365 |
| 4,841,869 A | 6/1989 | Takeuchi et al. | | 104/292 |
| 4,846,335 A | 7/1989 | Hartlepp | | 198/365 |
| 4,848,242 A | 7/1989 | Matsuo | | 104/290 |
| 4,856,642 A | 8/1989 | Nicholson et al. | | 198/365 |
| 4,876,966 A | 10/1989 | Okawa et al. | | 104/290 |
| 4,919,054 A | 4/1990 | Matsuo | | 104/94 |
| 4,982,828 A | 1/1991 | Nicolson et al. | | 198/365 |
| 4,984,674 A | 1/1991 | Fortenberry | | 198/365 |
| 5,054,601 A | 10/1991 | Sjogren et al. | | 198/365 |
| 5,086,905 A | 2/1992 | Polling | | 198/365 |
| 5,176,485 A | 1/1993 | Ruder et al. | | 414/392 |
| 5,255,774 A | 10/1993 | Yokoya | | 198/365 |
| 5,271,492 A | 12/1993 | Lewin et al. | | 198/830 |
| 5,372,234 A | 12/1994 | Fortenbery et al. | | 198/365 |
| 5,421,267 A * | 6/1995 | Mesko et al. | | 104/168 |
| 5,433,311 A | 7/1995 | Bonnet | | 198/370.04 |
| 5,664,660 A | 9/1997 | Prydtz et al. | | 198/370.04 |
| 5,676,514 A | 10/1997 | Higman et al. | | 414/339 |
| 5,836,436 A | 11/1998 | Fortenbery et al. | | 198/370.03 |
| 5,894,918 A | 4/1999 | Bonnet | | 198/370.04 |
| 6,009,992 A | 1/2000 | Erceg et al. | | 198/370.04 |
| 6,182,813 B1 | 2/2001 | Bonnet | | 198/370.09 |
| 6,239,744 B1 | 5/2001 | Singer et al. | | 342/359 |
| 6,298,975 B1 * | 10/2001 | Fortenbery et al. | | 198/370.03 |
| 6,367,610 B1 * | 4/2002 | Fortenbery et al. | | 198/370.04 |
| 6,829,999 B2 * | 12/2004 | Soldavini et al. | | 104/96 |
| 6,959,803 B1 | 11/2005 | Layne et al. | | 198/600 |
| 7,621,392 B2 * | 11/2009 | Langsdorf et al. | | 198/832 |
| 8,069,976 B1 | 12/2011 | Fortenbery et al. | | 198/860.1 |
| 8,496,103 B2 * | 7/2013 | Federmann et al. | | 198/465.3 |
| 2013/0341157 A1 | 12/2013 | Fortenbery et al. | | 198/370.04 |

OTHER PUBLICATIONS

"Design and Composition of Drive Systems for Bulk Goods-Sorting Machines," Engineering Process, Statistic Reports VDI, Row 13: Conveyor Technique/Logistics, No. 47, 1998.

* cited by examiner

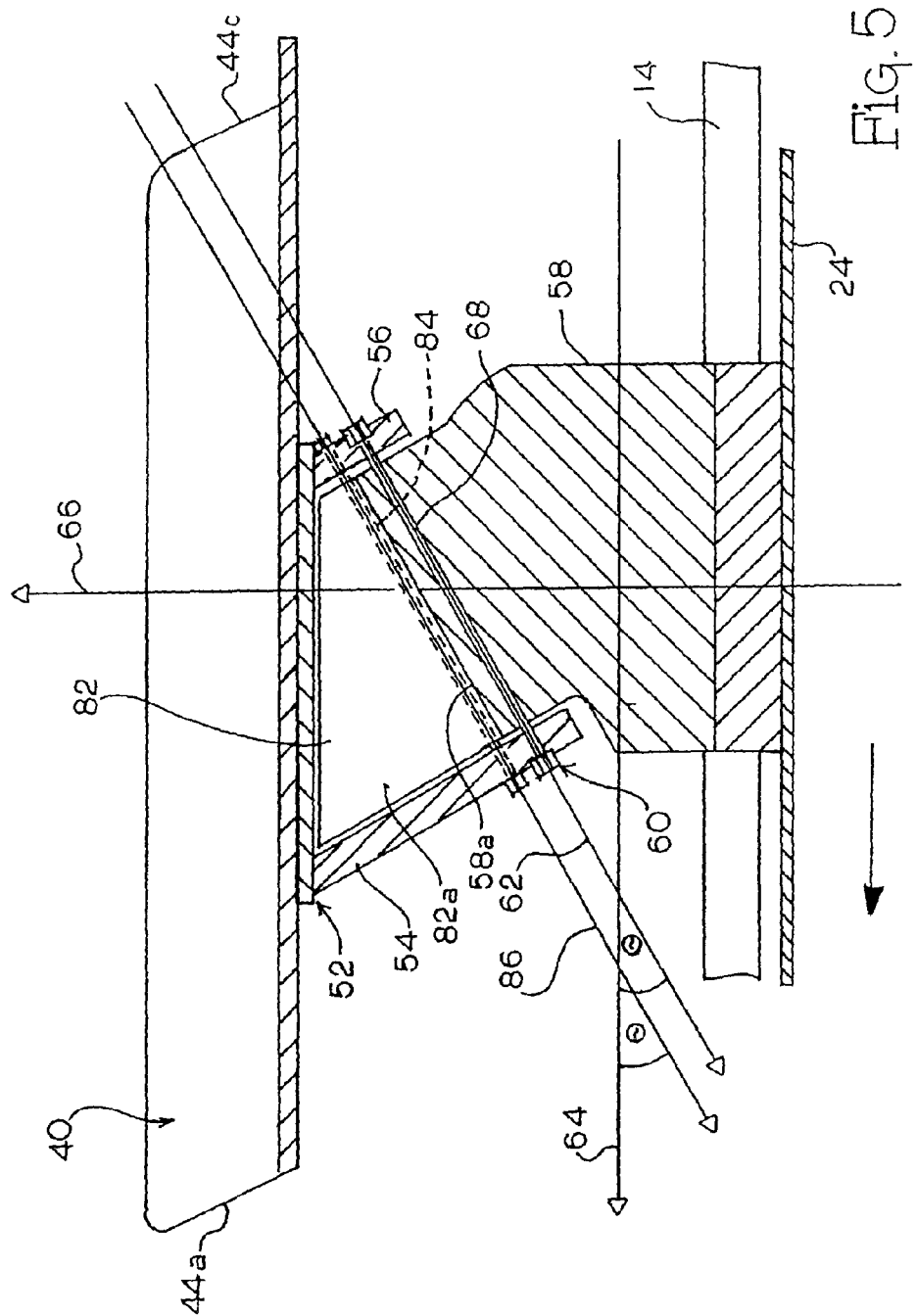

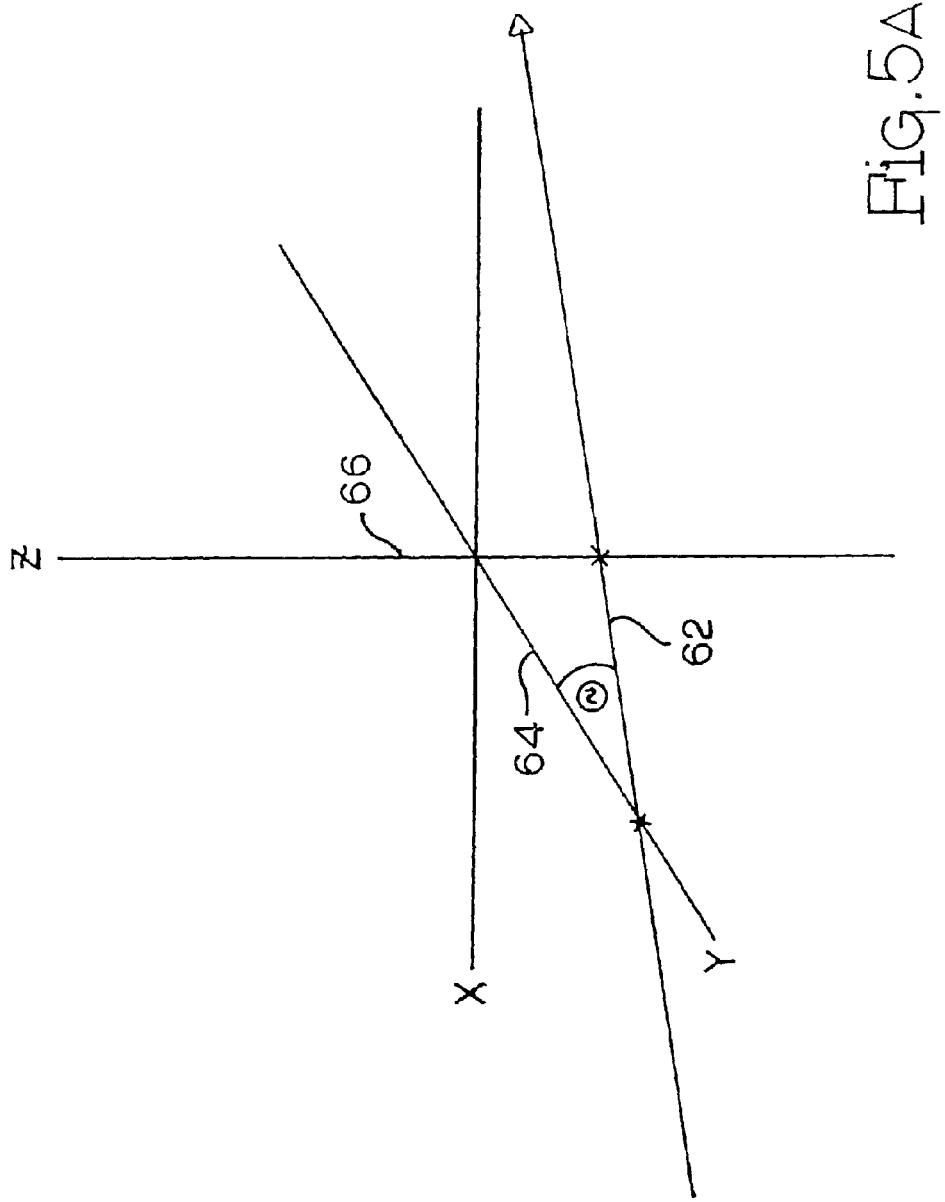

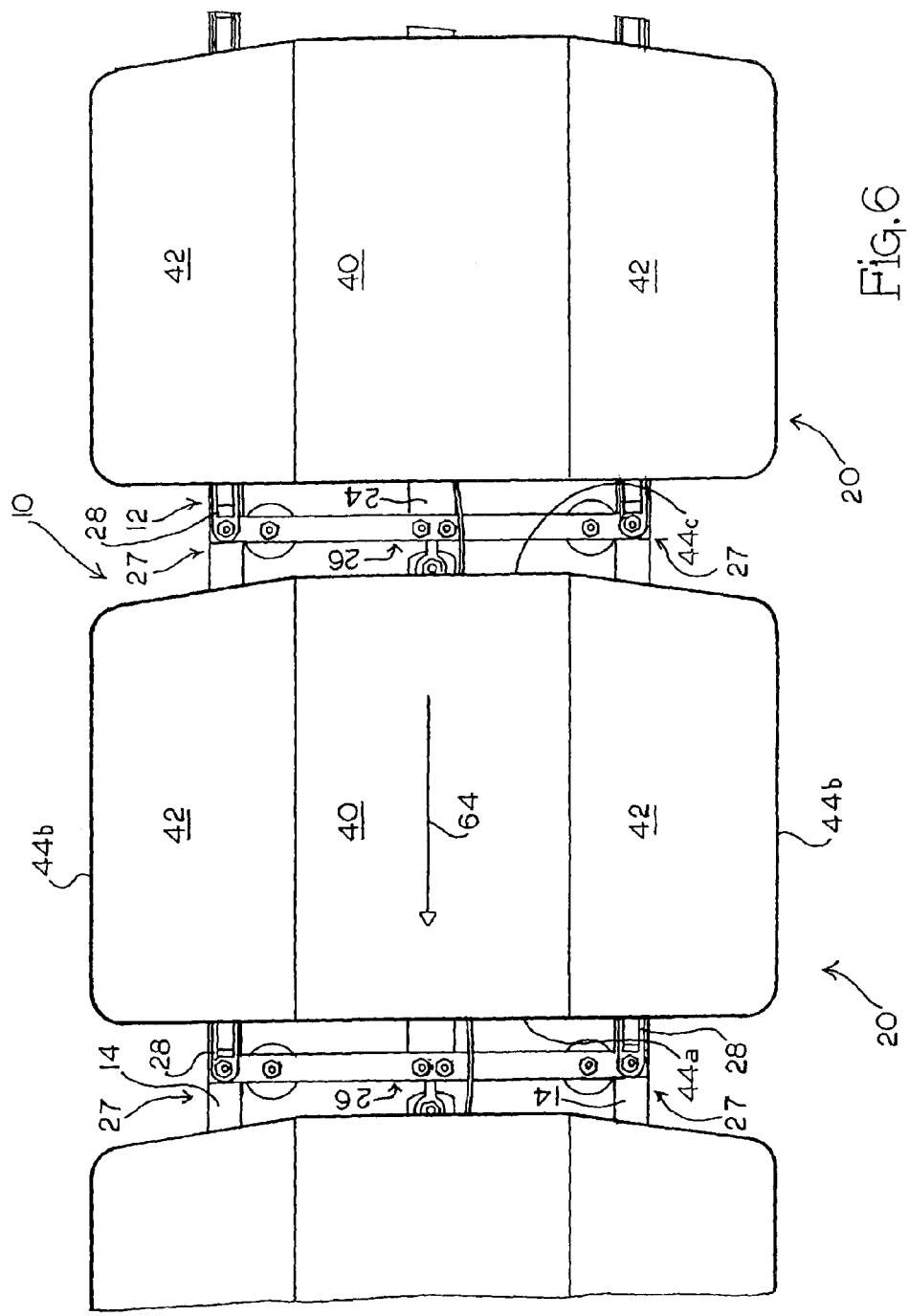

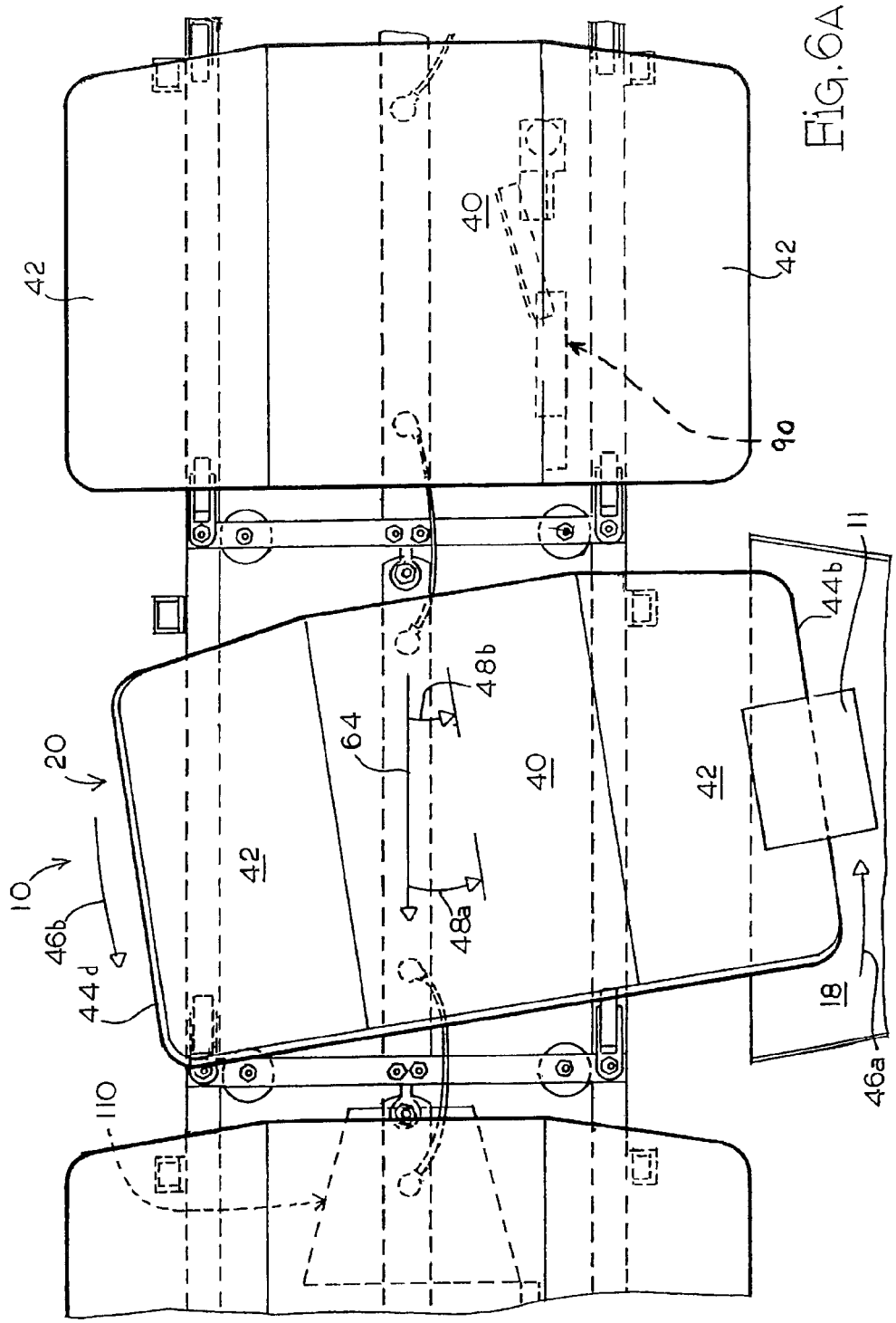

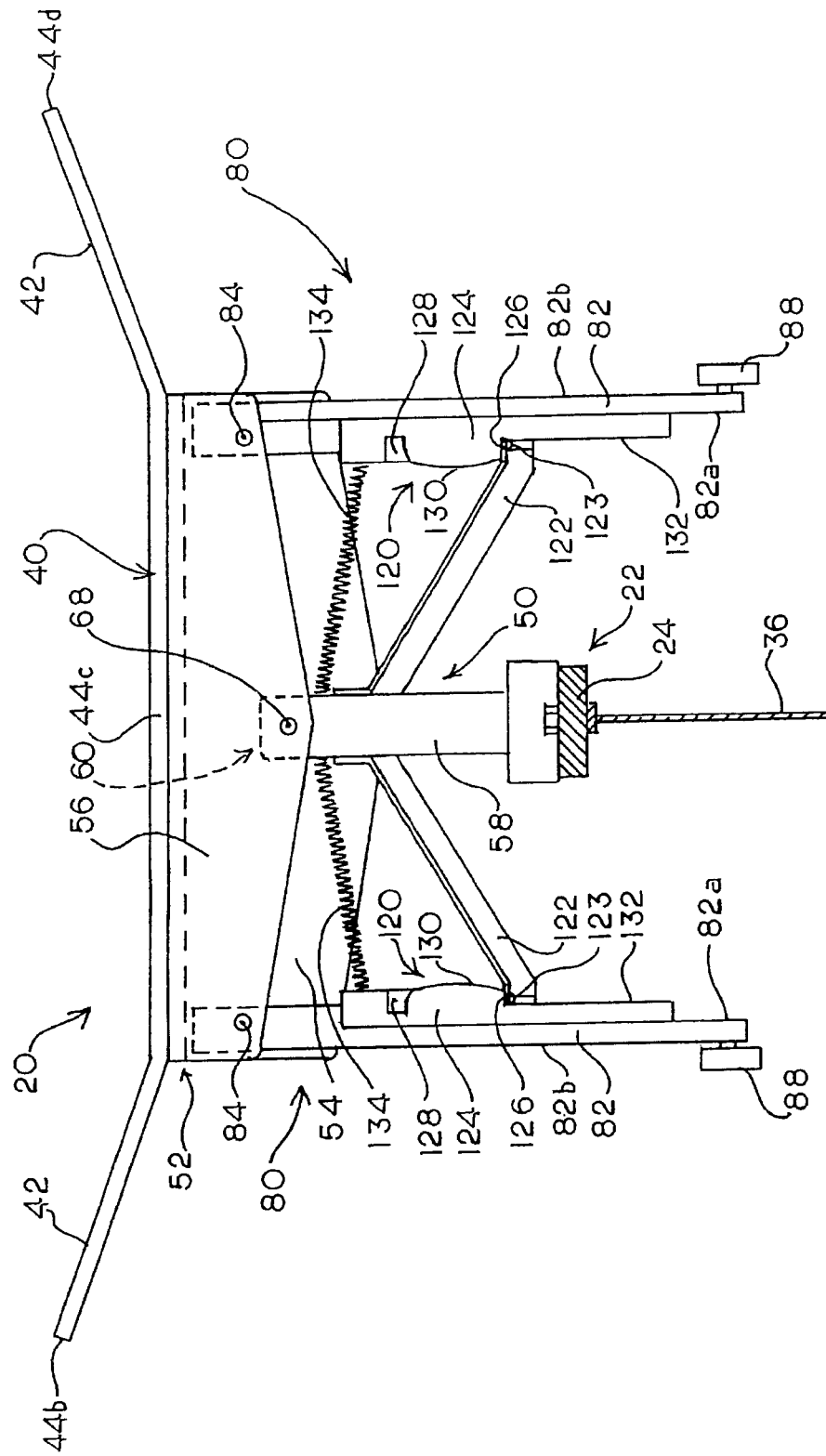

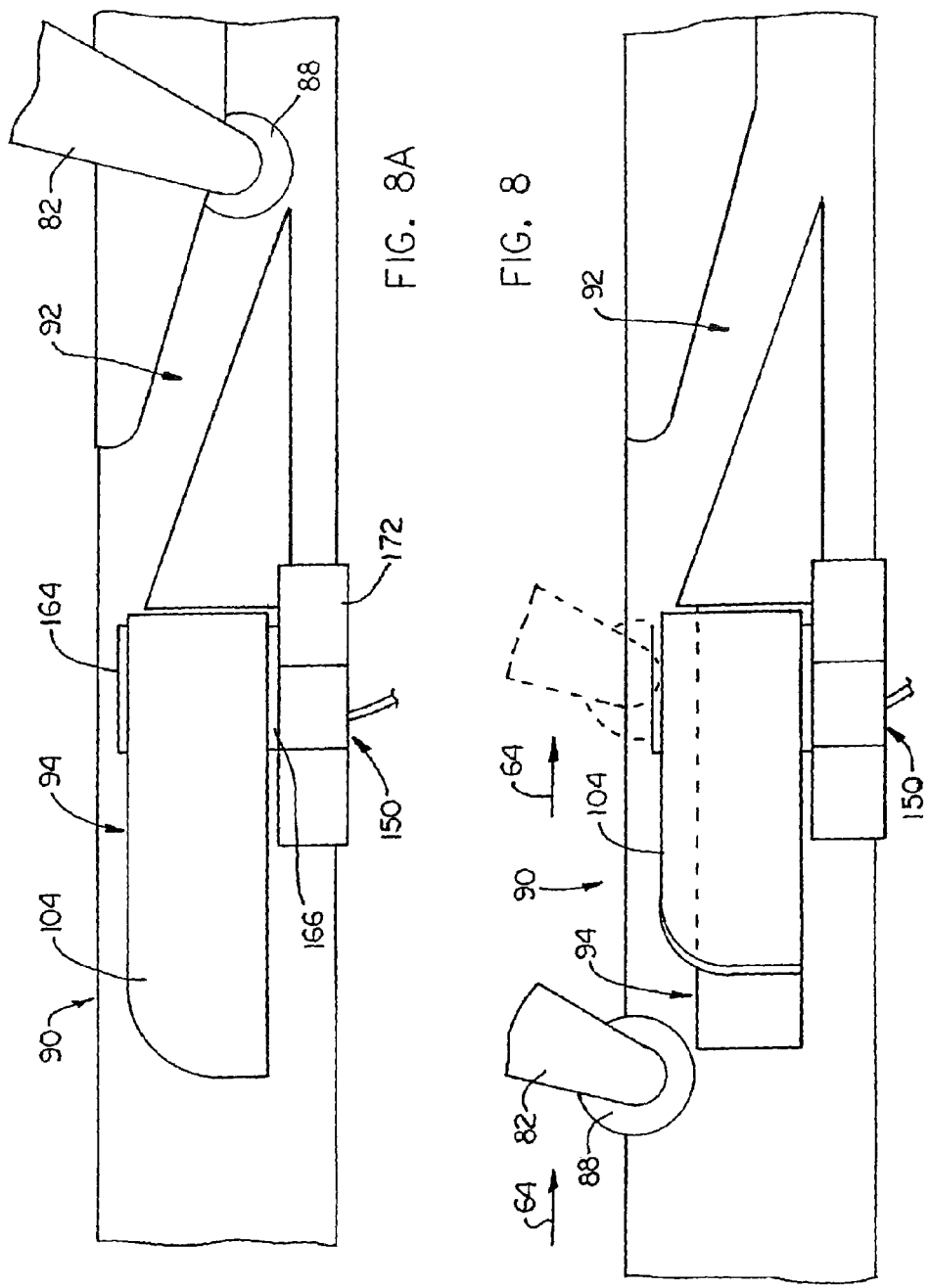

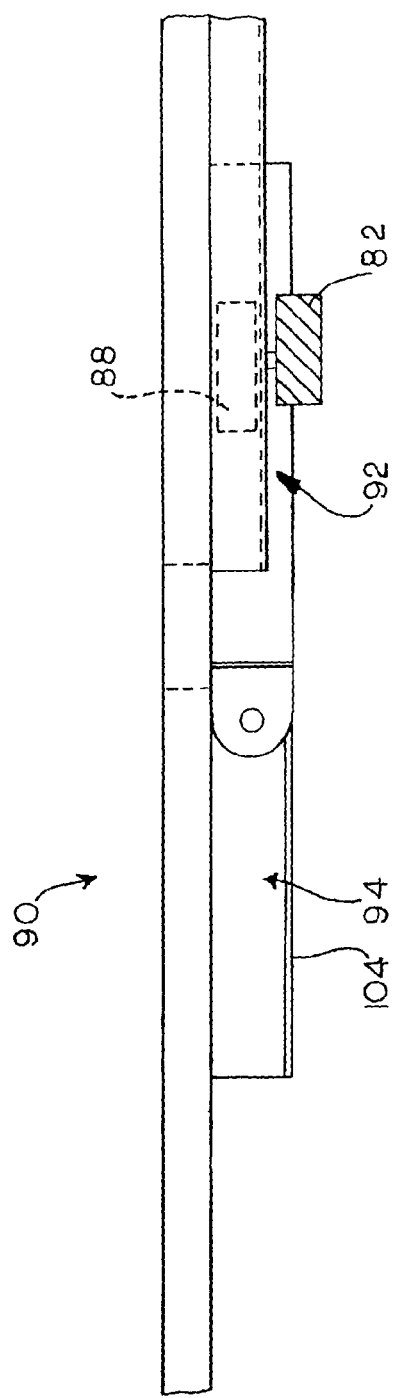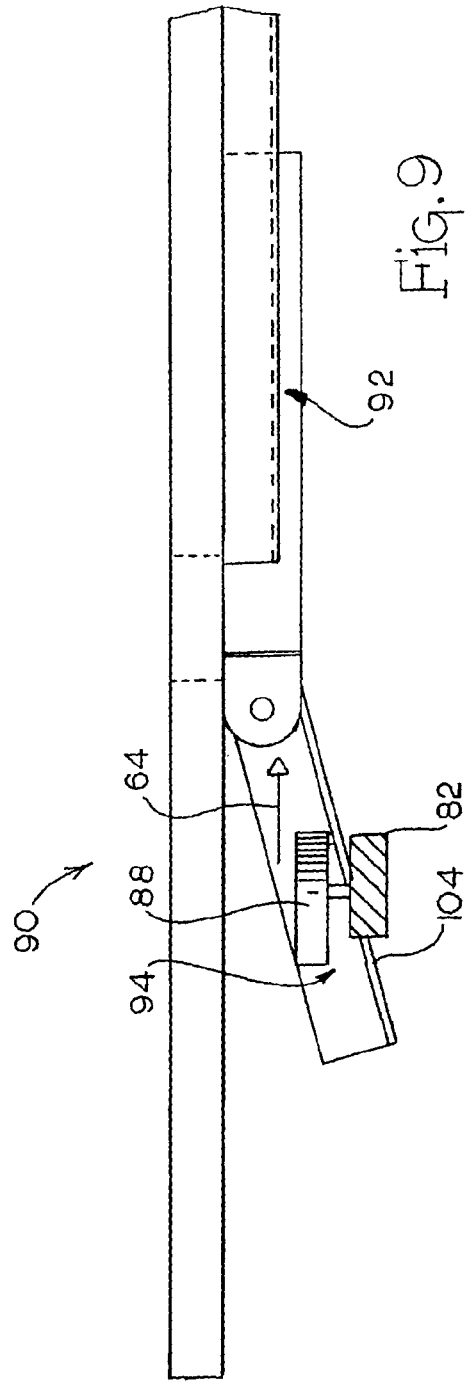

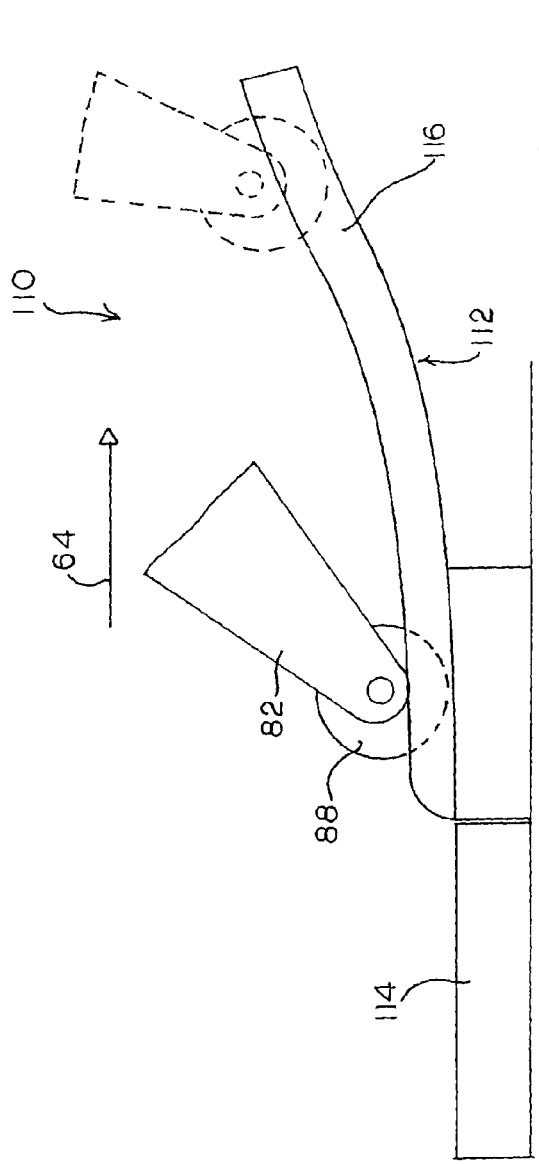
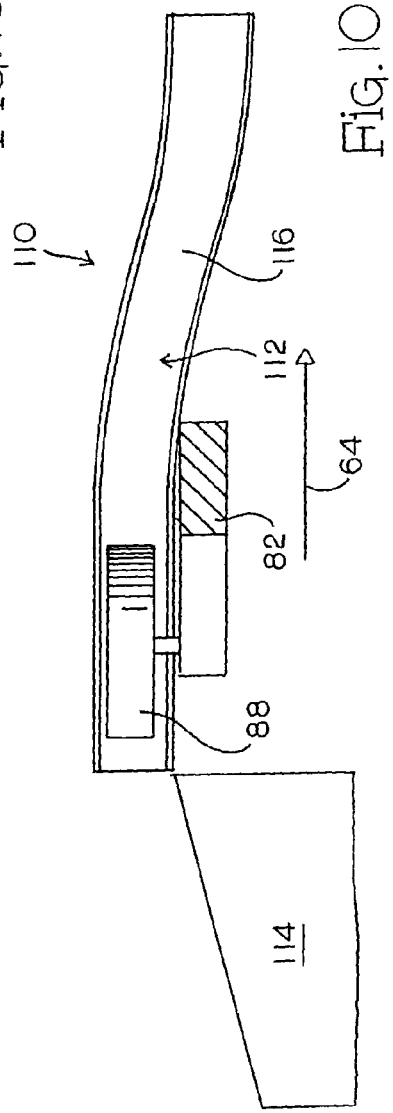

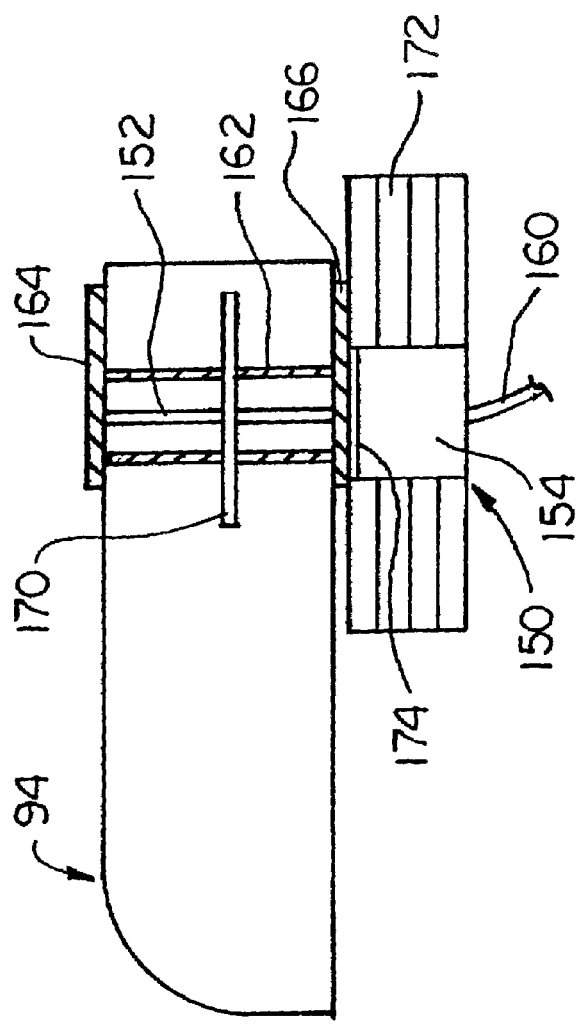

HIGH EFFICIENCY SORTING CONVEYOR

RELATED APPLICATIONS

This application is a divisional application of U.S. application Ser. No. 13/429,637, filed Mar. 26, 2012, which is incorporated herein by reference in its entirety.

FIELD OF THE TECHNOLOGY

The present inventions relate generally to package sorting conveyors, and more particularly to a sorting conveyor having improved set-up and maintenance positioning.

BACKGROUND

Conveyor systems having a number of individual carrying carts have been commonly used for many years to carry and sort packages or other items, such as mail. For example, U.S. Pat. No. 5,054,601 to Sjogren et al. discloses a package sorting conveyor comprised of a train of tilt tray carriers coupled in tandem to form a continuous loop. Each carrier includes a pivotally mounted tilt tray normally maintained in an upright position. The carriers are moved around the loop by a series of motors spaced around the loop. Branching out from the loop are outfeed chutes or the like for receiving packages from the carriers. When a particular carrier holding a particular package to be sorted reaches a selected outfeed chute, an actuator tilts the tray to dump the package into the outfeed chute. Another example of a typical package sorting conveyor is disclosed in International PCT Application Number PCT/DK90/00047 of Kosan Crisplant A/S, now U.S. Pat. No. 5,664,660.

While conventionally-designed package sorting conveyors provide effective means of transmitting a driving force when properly set-up, finding and maintaining the correct balance of position and pressure is often a difficult and uncertain procedure. Therefore, highly-skilled operators are often required to ensure proper set-up and maintenance. For instance, a set-up with too little pressure may cause a drive to slip, which may cause excessive wear to friction material. Conversely, if the set-up has too much pressure, the life of the friction material is compromised, particularly due to heat build-up.

One additional concern with many package sorting conveyors is that conventional conveyor carriers laterally tilt only on a horizontal axis parallel to the direction of conveyor travel. While this accomplishes the objective of dumping the package from the carrier into an outfeed chute or the like, the package is often roughly tumbled or rolled, sometimes damaging the package's contents. One reason for this is that the packages typically are unloaded from the carrier while still traveling forward at the same speed as the conveyor. Thus, packages tend to slam into a forward retaining wall of the outfeed chute before sliding down the chute. Another problem with conventional laterally tilting conveyors is that because the packages are moving forward at full speed when they are unloaded into the outfeed chute, the outfeed chute must be relatively wide so that packages do not miss the chute and fall off the conveyor past the chute. This often unnecessarily increases the overall size of the conveyor system.

U.S. Pat. No. 4,744,454 and an improvement thereto, U.S. Pat. No. 5,086,905, both to Polling, disclose previous attempts to remedy some of these problems of rough handling by conventional laterally tilting conveyor carriers. Both of these patents to Polling disclose a conveyor element for a package conveyor that includes a tilting carrier tray mounted to be rotatable about two swivel axes. A first swivel shaft extends obliquely downward from the underside of the carrying tray and is in turn connected at an angle to the end of a second swivel shaft extending obliquely upwards from a base support part of the conveyor element. Together, the two swivel shafts form a "V" that points in the direction of conveyor travel. Both of the swivel shafts lie in the vertical plane of symmetry of the conveyor element when the carrier tray is disposed in its upright position.

Because the carrier tray of Polling rotates about two oblique axes, the carrier tray can be tilted not only lateral on a horizontal axis, but is moved through a geometrically complex spatial reorientation during package discharge. This allows for more gentle placement of a package on an outfeed chute than can be accomplished using conventional conveyor trays that laterally tip on only a horizontal axis. The Polling conveyor element more gently handles the packages by imparting some degree of rearward velocity to the packages as they are discharged, which, when added to the forward velocity of the conveyor system, results in the packages' forward velocity during discharge being less than that of the conveyor system itself.

However, the conveyor elements of both of Polling's patents are unduly complicated and intolerant of manufacturing discrepancies. In fact, the second Polling conveyor element (U.S. Pat. No. 5,086,905) was invented in an attempt to simplify the original design disclosed in the first Polling patent (U.S. Pat. No. 4,744,454), which had proved to be too expensive and complicated to manufacture efficiently. As a result of this complexity and cost, the Polling devices have not enjoyed significant commercial acceptance and success.

One solution to these problems is shown in U.S. Pat. No. 5,836,436, issued Nov. 17, 1998, and U.S. Pat. No. 6,367,610, issued Apr. 9, 2002, and co-owned by the Assignee of the present inventions, which are hereby incorporated by reference in their entirety. One feature of these references is the use of a pull-down design for tilting the improve trays.

Another example of a sorter conveyor using a pull-down design for tilting its trays is shown in U.S. Pat. No. 5,664,660, issued to Prydtz. The '660 patent is directed to a sorter conveyor having laterally tiltable transport trays, instead of a conventional transport chain driven by a driving station, in which a driving wheel or worm cooperates with the chain links, these being advanced arranged with guiding rails along a small mutual spacing and carrying both the transport trays and the tilt mechanisms associated therewith, which conventional arrangement causes considerable problems with respect to tolerances for both the longitudinal pitch of the chain links and the mounting of the guiding rails. The invention includes carts that are advanced along mutually widely spaced guiding rails, whereby the tolerance demands on the latter are reduced considerably. Also, the carts are advanced by way of stationary linear motors, which, supposedly, renders any tolerance demands on the longitudinal pitch of the tray units entirely superfluous. Also the tilting mechanisms may be given a very simple design according to the patent. However, it has been discovered that there are operational problems associated with this type of design, especially the operation of its linear motors and tilting mechanism.

While the design shown in U.S. Pat. No. 5,836,436 overcomes some of the problems associated with the prior art designs, some problems have begun to surface over time as the units have been operated. One of these problems is when there is a mis-tip which causes "cascading errors."

"Cascading errors" were first discovered when audits at the end of the chute indicated there were more errors occurring than were predicted by errors indicating by tray verification.

Normally, when a tray is to tip to the right immediately before the tray is being straightened, a series of photocells determines if the right hand arm is in the "low" or "tipped" position, or the "up" or "latched" position. If the controls said that the arm should be tipped and the verifier says that the arm is tipped then it was assumed that the product went down the correct chute. However, in certain cases, tray verification would predict five errors but chute audits would indicate 35 errors. This previously unknown effect is referred to in this application as "cascade errors."

Most pull-down tilting mechanisms are actuated by spring when the pivot switch is released by an energizing solenoid. In other words, the pivot switch is spring-biased in the "out" position but held in the retained position by the solenoid.

When the computer provides a pulse, the solenoid plunger retracts, enabling the pivot switch to spring into the "out" position. The wheel strikes the pivot switch in front of the pivot point and the pivot switch unlatches the carriage and then as the wheel strikes the tail of the pivot switch, it pushes the pivot switch back to the home position and the spring on the solenoid plunger pushes the plunger into a detent capturing the pivot switch in the home position. The computer initiates the unlatch but it is the action of the wheel on the tail that normally relatches it.

If the solenoid does not return to capture the pivot switch before the wheel leaves the pivot switch's tail or a wheel is missing or broken, this will allow the pivot switch to move away from its intended home position back into the engagement position. The next tilt module that is not in the down position will then strike the pivot switch, tilt, and reset the pivot switch. If the pivot switch relatches properly this time, then that particular pivot switch will cause no more errors. If the pivot switch does not relatch it can again go into the engaged position and cause additional problems.

The cascade effect, though, comes from the first carriage that was tipped incorrectly, for if it were assigned a tilt position further downstream, when that carriage (which has been tilted incorrectly) gets in position to unload, the pivot switch at the proper destination chute will move into the engagement position. But because that arm has been incorrectly tipped upstream, no action will take place and the pivot switch will stay in the out position until the next untipped carriage arrives. That carriage will then be tipped at the wrong destination but should cause that pivot switch to relatch. If that particular tray was assigned a chute destination further downstream, when it arrives at its proper destination, the pivot switch will move into the engagement position, but again cannot engage because the tilt module is already in the low position, the tilt module will pass by and will not relatch the pivot switch. This pivot switch will then stay in the out position capturing the wheel of the next tilt module that is not tipped. This error will than continue to cascade downstream until eventually the error will pass the last destination and the system should heal itself.

However, there are some conditions that can exist that cause the error not to heal itself but continue to cause problems. An example would be if a particular tilt module were missing a wheel; that tilt module could then be loaded and when it gets to its destination, the pivot switch will go out to engage the wheel but with no wheel the module will not tip. The pivot switch will then catch the next available tray beginning the cascade problem. This will continue to repeat itself and will occur and start cascade error any time the tray with the missing wheel is assigned a destination.

One attempted solution to this problem is to use the tip verification switch to shut the sorter down if the pivot switch does not return to the "home" position within a given time period. However, with a large sorter this requires a maintenance man to then check the pivot switch to see if it should be reset and whether a wheel is missing. In the meantime, everything just sits on the sorter. For time critical applications, such as airline baggage sorting, this delay may be unacceptable.

One solution to these problems is shown in U.S. Pat. No. 6,009,992, issued Jan. 4, 2000 and also owned by the Assignee of the present inventions, which is hereby incorporated by reference in its entirety. One feature of this reference is the use of a powered up and powered down bi-directional pivot switch.

However, most of these designs are based around linear induction motors (LIMs) which are well accepted today due to their quietness and low maintenance. Unfortunately, for all their advantages LIMs are not very energy efficient. For example, pairs of LIMs, spaced at 80 feet intervals and operated at 480 volts, draws about 15 amps. This is about 90 watts per foot of sorter for about 70 pounds of thrust. To the contrary, prior art chain drives would draw about 15 watts per foot of sorter for about 1500 pounds of thrust. Thus, the modern LIM drives, for all their other advantages, are energy hogs. However, prior art, mechanical chain drives are just too noisy and high maintenance for today's market.

Therefore, Applicants desire a new and improved sorting conveyor without many of the drawbacks presented with traditional conveyor systems.

SUMMARY

The present inventions are directed to an improved sorting conveyor for transporting/unloading objects and having pivot block assemblies that are coupled together and adapted so that movement of each pivot block assembly mirrors movement of the other pivot block assembly. In some embodiments, an opposed roller motor assembly for a sorting conveyor for transporting objects and unloading objects at one or more unloading stations adjacent the conveyor includes a conveyor track and a train of conveyor carts connected end-to-end. Each of the conveyor carts may have a trailer frame base, a carrying means for holding objects and an unloading means. The trailer frame base may include a roller structure for engaging the conveyor track, an extended fin driven member responsive to the opposed roller motor assembly, adjacent spaced apart driven members and a hitch mechanism for connecting each conveyor cart to an adjacent conveyor cart. The adjacent spaced apart driven members may have vertically overlapping edges. The unloading means may be for unloading the objects into unloading stations on at least one side of the conveyor. The apparatus may include a motor, a support frame, at least one cantilevered, drive roller and an opposing surface.

The support frame may be attached to the conveyor track for supporting said motor. The least one cantilevered, drive roller may be connected to said motor and to one pivot block assembly and another pivot block assembly that is adapted for positioning said drive roller adjacent to one surface of said extended fin driven member. In some examples, the least one cantilevered, drive roller is connected to said motor and to a first pivot block assembly and a second pivot block assembly that is adapted for positioning said drive roller adjacent to one surface of said extended fin driven member.

The pivot block assemblies may be coupled together with a self-tensioning adjustment assembly. The self-tensioning adjustment assembly may include at least one motor adjustment link, a second link and a connecting roller. The at least one motor adjustment link may be affixed to one of said pivot block assemblies. The second link may be affixed to the other pivot block assembly. The connecting roller link may then couple said at least one motor adjustment link and said second link. In other examples, a first pivot block assembly and a second pivot block assembly may be coupled together with the self-tensioning adjustment assembly. In these particular examples, the self-tensioning adjustment assembly may include a first motor adjustment link, a second motor adjustment link and a connecting roller link. The first motor adjustment link may be affixed to said first pivot block assembly. The second motor adjustment link may be affixed to said second pivot block assembly. Finally, the connecting roller link may couple the first motor adjustment link and said second motor adjustment link.

The opposing surface may be adjacent to the other surface of said extended fin driven member for off-setting the mechanical load of said drive roller. The support frame may include a base that is attached to said conveyor track and said self-tensioning adjustment assembly.

The self-tensioning adjustment assembly may include a drive clamp plate connected to said base. A lever may be connected to said self-tensioning adjustment assembly and adapted to adjust the pivot block assemblies. For example, the lever may adjust the first pivot block assembly and the second pivot block assembly. In particular embodiments, the lever is adapted so that movement of each pivot block assembly mirrors movement of the other pivot block assembly. The self-tensioning adjustment assembly may also include a self-tensioning clamp plate for supporting said lever. The self-tensioning clamp plate may have a mounting bracket connecting a proximate end of said lever to said self-tensioning clamp plate.

In other embodiments, the self-tensioning adjustment assembly may include a lever retainer affixed to said self-tensioning clamp plate to retain a distal handling end of said lever in an operating position. The self-tensioning adjustment assembly may have a coupling arm connecting said lever and said connecting roller link Finally, the self-tensioning adjustment assembly may have a spring assembly between said coupling arm and said connecting roller link. The spring assembly may include a spring or the like.

The drive roller assembly may include a generally cylindrical roller having an outer elastomeric surface for frictionally engaging said extended fin. The elastomeric surface may be a polyurethane. For instance, the polyurethane may be a thermosetting-type urethane. The polyurethane may have a Shore A hardness between about 70 and about 80.

The motor assembly may include a rotary motor and a drive belt connecting said motor and said drive roller. The drive roller may include a frictional surface for receiving said drive belt. The opposing surface adjacent to the other surface of said extended fin driven member for off-setting the mechanical load of said drive roller may be a second drive roller assembly. The second drive roller assembly may further include a second motor assembly.

A braking assembly may be adapted to tighten said drive roller's engagement with said extended fin driven member, for example during a braking event. The braking assembly may include a braking body that is adjacent to said at least one pivot block assembly. Further, the braking body may have at least one paw distal end. An extension spring may connect the braking body and at least one pivot block assembly. The braking assembly may also include a sprocket, and in some examples the sprocket may be connected to at least one pivot block assembly, drive motor rollers or the like. Typically, the paw distal end is adapted to pivot into a ratchetable mating contact with said sprocket, for instance whereby the sprocket is adapted to ratchet the paw distal end only in one direction, e.g. a clockwise rotation in exemplary embodiments. For instance, the ratchetable mating contact may prevent the sprocket from rotating in an opposing direction, e.g. a counterclockwise rotation in exemplary embodiments.

In other embodiments, a sorting conveyor for transporting objects and unloading objects at one or more unloading stations adjacent the conveyor comprises a conveyor track, a train of conveyor carts, and an opposed roller motor assembly. The train of conveyor carts may be connected end-to-end. The opposed roller motor assembly moves said conveyor carts on said conveyor track. The opposed roller motor assembly may include a cantilevered, drive roller connected to one pivot block assembly and another pivot block assembly adapted for positioning said drive roller. For instance, the cantilevered, drive roller connected may be connected to a first pivot block assembly and a second pivot block assembly adapted for positioning said drive roller. The pivot block assemblies may be coupled together and adapted so that movement of each pivot block assembly mirrors movement of the other pivot block assembly. Again, for instance, the first pivot block assembly and said second pivot block assembly may be coupled together and adapted so that movement of each pivot block assembly mirrors movement of the other pivot block assembly.

The conveyor carts may include a trailer frame base, a carrying tray for holding the objects and a tiltable support apparatus. The trailer frame base may have a roller structure, a driven member, adjacent spaced apart driven members and a hitch mechanism. The roller structure may engage said conveyor track. The driven member may be responsive to said opposed roller motor assembly. The adjacent spaced apart driven members may have vertically overlapping edges. And the hitch mechanism may be used for connecting each conveyor cart to an adjacent conveyor cart.

The tiltable support apparatus may support said carrying tray above said trailer frame base and allow tilting of said carrying tray towards at least one side of the conveyor, for instance to unload objects into unloading stations on at least one side of the conveyor. The tiltable support apparatus may include an upper support structure, a pivot structure, a lower support structure, and a tilting mechanism. The upper support structure may be joined to said carrying tray. The lower support structure may be joined to said trailer frame base. The pivot structure may connect the upper support structure to the lower support structure, for instance along a pivot axis. The tilting mechanism may tilt said carrying tray on said tiltable support apparatus to thereby unload objects into one of the unloading stations adjacent the conveyor. The tilting mechanism may have a pair of actuating arms and a pull-down mechanism. The pair of actuating arms may be attached to said carrying tray on opposite sides of said tiltable support apparatus. Further, each of said actuator arms may include a cam follower on a lower end of said actuator min.

The pull-down mechanism may be associated with each unloading station for selectively pulling down one of said actuating arms so as to pull one side of said carrying tray downwardly into a tilted position. Further, the pull-down mechanism may include a descending ramp that is adjacent to said conveyor track. The pull-down mechanism may also include a laterally pivoting switch for directing the cam follower of a selected actuator arm into said descending ramp and an actuator that is connected to said laterally pivoting switch for opening said laterally pivoting switch so as to capture a selected cam follower, and direct the cam follower into the descending ramp and for closing said laterally pivoting switch after capture of the cam follower. The tilting mechanism may further comprise a locking structure for locking said carrying the tray in the tilted position upon pulling down of one of said actuating anus, and for locking said carrying tray in the upright position upon pushing up of said actuating arm.

In some examples, the actuating arms are each pivotally attached to said carrying tray beneath said carrying tray. The pivot axes of said actuating arms may be parallel to the pivot axis of said tiltable support apparatus. The actuating arms may be pivotally attached to said upper support structure of said tiltable support apparatus. Further, the pivot axis of said pivot structure may lie in a vertical plane parallel to the conveyor line of travel. The actuating arms may therefore remain substantially parallel to the vertical plane parallel to the conveyor line of travel during pulling down and pushing up of said actuating arms to tilt said carrier tray.

The actuator may have an actuator arm having a first end and a second end, and a bi-directional actuator attached to said actuator arm second end. The actuator arm may further include a pivot switch that is connected to said first end of said actuator arm. The rotary actuator assembly may be operable to rotate said laterally pivoting switch to engage said cam follower and direct said cam follower of a selected actuator arm into said descending ramp. The bi-directional actuator may include a coil spring that is attached to said actuator arm second end to rotate said pivot switch to said closed position. The actuator may also include an outer clevis that is coaxially aligned around said actuator arm to protect said actuator arm.

The actuator arm may have a roll pin that extends substantially perpendicular from said actuator arm for connecting said actuator arm to said pivot switch. The outer clevis may have an aperture sized to allow said roll pin to extend outward therefrom into said pivot switch. The bi-directional actuator may be a brushless torque actuator. The brushless torque actuator may be mounted within a heat sink.

In yet other embodiments, a sorting conveyor for transporting objects and unloading objects at one or more unloading stations adjacent the conveyor includes a conveyor track, a train of conveyor carts connected end-to-end and an opposed roller motor assembly. The train of conveyor carts may be connected end-to-end. The opposed roller motor assembly may move said conveyor carts on said conveyor track. The roller motor assembly may include a motor, a support frame and at least one cantilevered, drive roller connected to said motor and to one pivot block assembly and to another pivot block assembly adapted for positioning said drive roller adjacent to one surface of said extended fin driven member. In other examples, the least one cantilevered, drive roller may be connected to said motor and to a first pivot block assembly and to a second pivot block assembly adapted for positioning said drive roller adjacent to one surface of said extended fin driven member. The opposing surface may be adjacent to the other surface of said extended fin driven member for offsetting the mechanical load of said drive roller The pivot block assemblies may be coupled together with a self-tensioning adjustment assembly. The self-tensioning adjustment assembly may include a motor adjustment link that is affixed to one of said pivot block assemblies, a second link that is affixed to said other pivot block assembly and a connecting roller link coupling said at least one motor adjustment link and said second link. In other examples, a first pivot block assembly and said second pivot block assembly may be coupled together with a self-tensioning adjustment assembly. This particular self-tensioning adjustment assembly may include a motor adjustment link that is affixed to said first pivot block assembly, a second motor adjustment link that is affixed to said second pivot block assembly and a connecting roller link coupling said a first motor adjustment link and said second motor adjustment link.

Each of said conveyor carts may include a trailer frame base, a carrying tray for holding the objects and a tiltable support apparatus. The trailer frame base may have a roller structure for engaging said conveyor track, a driven member responsive to said opposed roller motor assembly, and a hitch mechanism for connecting each conveyor cart to an adjacent conveyor cart.

The tiltable support apparatus may support said carrying tray above said trailer frame base and allow tilting of said carrying tray towards at least one side of the conveyor to unload objects into unloading stations on at least one side of the conveyor. The tilting mechanism may include an upper support structure joined to said carrying tray, a lower support structure joined to said trailer frame base, and a pivot structure connecting the upper support structure to the lower support structure along a pivot axis. A tilting mechanism may tilt said carrying tray on said tiltable support apparatus to thereby unload objects into one of the unloading stations adjacent the conveyor. The tilting mechanism may have a pair of actuating arms attached to said carrying tray on opposite sides of said tiltable support apparatus; and a pull-down mechanism associated with each unloading station for selectively pulling down one of said actuating anus so as to pull one side of said carrying tray downwardly into a tilted position. Each of said actuator arms may have a cam follower on a lower end of said actuator arm. The pull-down mechanism may have a descending ramp adjacent said conveyor track, a laterally pivoting switch for directing the cam follower of a selected actuator arm into said descending ramp and an actuator connected to said laterally pivoting switch for opening said laterally pivoting switch so as to capture a selected cam follower and direct the cam follower into the descending ramp and for closing said laterally pivoting switch after capture of the cam follower. The tilting mechanism may have a locking structure for locking said carrying tray in the tilted position upon pulling down of one of said actuating arms, and for locking said carrying tray in the upright position upon pushing up of said actuating arm.

The actuating arms may each be pivotally attached to said carrying tray beneath said carrying tray. The pivot axes of said actuating arms are parallel to the pivot axis of said tiltable support apparatus. In other examples, the actuating arms may be pivotally attached to said upper support structure of said tiltable support apparatus. Further, the pivot axis of said pivot structure may lie in a vertical plane parallel to the conveyor line of travel, and wherein said actuating arms remain substantially parallel to the vertical plane parallel to the conveyor line of travel during pulling down and pushing up of said actuating arms to tilt said carrier tray.

The locking structure may include a pair of laterally extending locking flanges, a pair of locking blocks and a biasing member. The pair of laterally extending locking flanges may be on opposite sides of said tiltable support apparatus. The pair of locking blocks may be mounted to inner surfaces of said actuating arms, each locking block may have locking channels that receive said locking flanges. Finally, the biasing members may be attached to both actuating arms for biasing said actuating arms towards each other so as to urge said each of said locking flanges into one of said locking channels.

Each locking block may include a locking channel associated with the tilted position of said carrying tray, and wherein each locking block includes a locking channel associated with the upright position of said carrying tray. Each said locking flange may include a roller mounted to an outer edge thereof. Further, each said locking block may include a cammed section between said locking channels over which said rollers on the outer edges of said locking flanges roll.

The conveyor track may comprise two parallel rails. The trailer frame base may include a longitudinal base member that extends between the two parallel rails parallel to the conveyor line of travel. The roller structure may comprise two laterally extending cam follower mechanisms, one cam follower mechanism riding on each conveyor track rail. Each said cam follower mechanism may include an axle caster that holds a cam follower, each said axle caster including two forks, a bearing bore disposed at a juncture between said two forks, and at least one flange bearing seated within said bearing bore and disposed around an axle shaft extending from said roller structure. The cam follower may be held in place in said axle caster by a nut and bolt extending through said cam follower and both of said forks, wherein said axle caster also includes an opening on one side of said bearing bore that communicates with a space between said two forks, and wherein said at least one flange bearing is secured within said bearing bore by tightening said nut and bolt so as to inwardly flex said two forks towards each other, thereby slightly closing said opening and distorting said bearing bore. The each conveyor track rail may be supported only on an outside edge, and wherein each cam follower mechanism comprises three cam followers.

Each cam follower mechanism may include an upper cam follower for riding on a top edge of a track rail, a middle cam follower for riding on an inside edge of the track rail, and a lower wheel for riding on a bottom edge of the track rail. The cam follower mechanisms may be attached to a forward end of said longitudinal base member. The driven member of said trailer frame base may comprise a fin that is moved in the conveyor line of travel by said opposed roller motor assembly. The opposed roller motor assembly and said metal fin may be both vertically oriented beneath said trailer frame base. The metal fin is generally parallelogram-shaped with rearwardly angled front and rear edges. The opposed roller motor assembly may comprise at least one drive roller and at least one opposing surface for off-setting the mechanical load of said drive roller.

The hitch mechanism may comprise a front hitch on a front end of said trailer frame base, a rear hitch on a rear end of said trailer frame base, and a hitch connector for connecting the front hitch of one conveyor cart to the rear hitch of an adjacent conveyor cart. The front hitch may be disposed overtop of the rear hitch. The trailer frame base may comprise an auxiliary cart connector for connecting each conveyor cart to an adjacent conveyor cart to prevent adjacent conveyor carts from separating upon failure of said hitch mechanism. The auxiliary cart connector may comprise an electrically conductive cable connected at one end to said trailer frame base and at another end to a trailer frame base of an adjacent conveyor cart. The sorting conveyor may further include at least one single-axis conveyor cart that comprises a tiltable support apparatus having a horizontal pivot axis that is disposed generally parallel to the conveyor line of travel.

The actuator may include an actuator arm and a bi-directional actuator. The actuator may have a first end and a second end, said pivot switch being connected to said first end of said actuator arm. The bi-directional actuator may be attached to said actuator arm second end, whereby said rotary actuator assembly is operable to rotate said laterally pivoting switch to engage said cam follower and direct said cam follower of a selected actuator arm into said descending ramp. The bi-directional actuator may include a coil spring attached to said actuator arm second end to rotate said pivot switch to said closed position. The bi-directional actuator may include an outer clevis that is coaxially aligned around said actuator arm to protect said actuator arm. The actuator arm may include a roll pin extending substantially perpendicular from said actuator arm for connecting said actuator arm to said pivot switch and wherein said outer clevis includes an aperture, said aperture being sized to allow said roll pin to extend outward therefrom into said pivot switch. The bi-directional actuator may be a brushless torque actuator. Further, the brushless torque actuator may be mounted within a heat sink.

The support frame may include a base attached to said conveyor track and said self-tensioning adjustment assembly. The self-tensioning adjustment assembly may include a drive clamp plate that is connected to said base. A lever may be connected to said self-tensioning adjustment assembly and adapted to adjust said pivot block assemblies. In other examples, a lever connected to said self-tensioning adjustment assembly and adapted to adjust said first pivot block assembly and said second pivot block assembly. The lever may be adapted that movement of each pivot block assembly mirrors movement of the other pivot block assembly.

The self-tensioning adjustment assembly may include a self-tensioning clamp plate for supporting said lever. The self-tensioning clamp plate may include a mounting bracket connecting a proximate end of said lever to said self-tensioning clamp plate. A lever retainer may affix to said self-tensioning clamp plate to retain a distal handling end of said lever in an operating position. A coupling arm may connect said lever and said connecting roller link. A spring assembly may be between said coupling arm and said connecting roller link.

A drive roller assembly may include a generally cylindrical roller having an outer elastomeric surface for frictionally engaging said extended fin. The elastomeric surface may be a polyurethane. The polyurethane may be a thermosetting-type urethane. The polyurethane may have a Shore A hardness between about 70 and 80.

The motor assembly may include a rotary motor and a drive belt connecting said motor and said drive roller, wherein said drive roller includes a frictional surface for receiving said drive belt. The opposing surface may be adjacent to the other surface of said extended fin driven member for off-setting the mechanical load of said drive roller is a second drive roller assembly. The second drive roller assembly may further include a second motor assembly.

A braking assembly may be adapted to tighten said drive roller's engagement with said extended fin driven member, for example during a braking event. The braking assembly may include a braking body that is adjacent to said at least one pivot block assembly. Further, the braking body may have at least one paw distal end. An extension spring may connect the braking body and at least one pivot block assembly. The braking assembly may also include a sprocket, and in some examples the sprocket may be connected to at least one pivot block assembly, drive motor rollers or the like. Typically, the paw distal end is adapted to pivot into a ratchetable mating contact with said sprocket, for instance whereby the sprocket is adapted to ratchet the paw distal end only in one direction, e.g. a clockwise rotation in exemplary embodiments. For example, the ratchetable mating contact may prevent the sprocket from rotating in an opposing direction, e.g. a counterclockwise rotation in exemplary embodiments.

In other embodiments, the locking structure may include a pair of laterally extending locking flanges, a pair of locking blocks and a biasing member. The pair of laterally extending locking flanges may be on opposite sides of said tiltable support apparatus. The pair of locking blocks may be mounted to inner surfaces of said actuating arms. Here, each locking block may have locking channels that receive said locking flanges. The biasing member attached to both actuating arms may bias said actuating arms towards each other, for instance so as to urge said each of said locking flanges into one of said locking channels.

Each locking block may have a locking channel that is associated with the tilted position of said carrying tray. Further, each locking block may include a locking channel that is associated with the upright position of said carrying tray. Each said locking flange may include a roller that is mounted to an outer edge thereof. Each said locking block may include a cammed section between said locking channels over which said rollers on the outer edges of said locking flanges roll.

Typically, the conveyor track comprises at least two parallel rails. The trailer frame base includes a longitudinal base member that extends between the two parallel rails parallel to the conveyor line of travel. The roller structure comprises two laterally extending cam follower mechanisms, one cam follower mechanism riding on each conveyor track rail. Each of said cam follower mechanism includes an axle caster that holds a cam follower. Further, each said axle caster includes two forks, a bearing bore disposed at a juncture between said two forks, and at least one flange bearing seated within said bearing bore and disposed around an axle shaft extending from said roller structure. The cam follower may be held in place in said axle caster by a nut and bolt extending through said cam follower and both of said forks. Said axle caster may also include an opening on one side of said bearing bore may be secured within said bearing bore by tightening said nut and bolt so as to inwardly flex said two forks towards each other, thereby slightly closing said opening and distorting said bearing bore.

In some examples, each conveyor track rail is supported only on an outside edge, and wherein each cam follower mechanism comprises three cam followers. Each cam follower mechanism may include an upper cam follower for riding on a top edge of a track rail, a middle cam follower for riding on an inside edge of the track rail, and a lower wheel for riding on a bottom edge of the track rail. The cam follower mechanisms may be attached to a forward end of said longitudinal base member.

The driven member of said trailer frame base may include a fin that is moved in the conveyor line of travel by said opposed roller motor assembly. The opposed roller motor assembly and said metal fin may both be vertically oriented beneath said trailer frame base. The metal fin is generally parallelogram-shaped with rearwardly angled front and rear edges. Further, the opposed roller motor assembly may include at least one drive roller and at least one opposing surface for off-setting the mechanical load of said drive roller.

The hitch mechanism may comprise a front hitch on a front end of said trailer frame base, a rear hitch on a rear end of said trailer frame base, and a hitch connector for connecting the front hitch of one conveyor cart to the rear hitch of an adjacent conveyor cart. The front hitch may be disposed overtop of the rear hitch.

The trailer frame base may include an auxiliary cart connector for connecting each conveyor cart to an adjacent conveyor cart, for instance to prevent adjacent conveyor carts from separating upon failure of said hitch mechanism. The auxiliary cart connector may have an electrically conductive cable connected at one end to said trailer frame base and at another end to a trailer frame base of an adjacent conveyor cart.

Generally, the sorting conveyor includes at least one single-axis conveyor cart that comprises a tiltable support apparatus having a horizontal pivot axis that is disposed generally parallel to the conveyor line of travel. Further, the sorting conveyor includes: a conveyor track; a train of the tilting conveyor carts connected end-to-end; and an opposed roller motor assembly for moving the conveyor carts on the conveyor track. The opposed roller motor assembly includes a pair of cantilevered, generally includes cylindrical rollers on each side of an extended driven member attached to each conveyor cart.

Each of the tilting conveyor carts includes a trailer frame base. The trailer frame includes a roller structure for engaging the conveyor track, a driven member responsive to the opposed roller motor assembly, and a hitch mechanism for connecting each tilting conveyor cart to an adjacent conveyor cart. The conveyor cart also includes a carrying tray for holding the objects and a tiltable support apparatus for supporting the carrying tray above the trailer frame base and for allowing tilting of the carrying tray towards at least one side of the conveyor to unload objects into unloading stations on at least one side of the conveyor.

The tilting mechanism tilts the carrying tray on the tiltable support apparatus to thereby unload objects into one of the unloading stations adjacent the conveyor. The tilting mechanism includes a pair of actuating arms attached to the carrying tray on opposite sides of the tiltable support apparatus and a pull-down mechanism associated with each unloading station for selectively pulling down one of the actuating arms so as to pull one side of the carrying tray downwardly into a tilted position.

In other embodiments, each of the actuator arms includes a cam follower on a lower end of the actuator arm, and wherein the pull-down mechanism includes a descending ramp adjacent the conveyor track, a laterally pivoting switch for directing the cam follower of a selected actuator arm into the descending ramp and a bi-directional, rotary actuator assembly connected to the laterally pivoting switch.

In yet other embodiments, the rotary actuator assembly includes an actuator arm having a first end and a second end, the pivot switch being connected to the first end of the actuator arm; and a bi-directional actuator attached to the actuator arm second end, whereby the rotary actuator assembly is operable to rotate the laterally pivoting switch to engage the cam follower and direct the cam follower of a selected actuator arm into the descending ramp and for closing the laterally pivoting switch after capture of the cam follower.

The opposed roller motor assembly preferably includes a pair of electric motors and a support frame attached to the conveyor track for supporting the motors. At least one pair of cantilevered, drive rollers are connected to each of the respective motors and adjacent to each of the surfaces of an extended fin driven member attached to each of the carts. Each drive roller offsets the mechanical load of the other drive roller.

Accordingly, another aspect of the present inventions is to provide a sorting conveyor for transporting objects and unloading objects at one or more unloading stations adjacent the conveyor. The sorting conveyor includes: a conveyor track; a train of conveyor carts connected end-to-end; and an opposed roller motor assembly for moving the conveyor carts on the conveyor track.

Another aspect of the present disclosure is to provide an opposed roller motor assembly for a sorting conveyor having a train of conveyor carts connected end-to-end for transporting objects and unloading objects at one or more unloading stations adjacent the conveyor. The opposed roller motor assembly includes: a motor; a support frame attached to the conveyor track for supporting the motor; at least one cantilevered, drive roller connected to the motor and adjacent to one surface of an extended fin driven member attached to each of the carts; and an opposing surface adjacent to the other surface of the extended fin driven member for off-setting the mechanical load of the drive roller.

Still another aspect of the present disclosure is to provide a sorting conveyor for transporting objects and unloading objects at one or more unloading stations adjacent the conveyor. The sorting conveyor includes: a conveyor track; a train of conveyor carts connected end-to-end, each of the conveyor carts including: a trailer frame base, including: a roller structure for engaging the conveyor track, an extended fin driven member, and a hitch mechanism for connecting each conveyor cart to an adjacent conveyor cart; a carrying tray for holding the objects; and a tiltable support apparatus for supporting the carrying tray above the trailer frame base and for allowing tilting of the carrying tray towards at least one side of the conveyor to unload objects into unloading stations on at least one side of the conveyor; and an opposed roller motor assembly for moving the conveyor carts on the conveyor track, the roller motor assembly including: a motor; a support frame attached to the conveyor track for supporting the motor; at least one cantilevered, drive roller connected to the motor and adjacent to one surface of the extended fin driven member; and an opposing surface adjacent to the other surface of the extended fin driven member for off-setting the mechanical load of the drive roller.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which:

FIG. 5 is a sectional side view of a tilting conveyor cart, taken along lines 5-5 of FIG. 2, which shows the tiltable support apparatus and the angled pivot structure of the tilting conveyor cart of the inventions;

FIG. 5A is a geometric depiction of the conveyor cart pivot axis and conveyor line of travel as they relate to three-dimensional X,Y,Z spatial coordinates;

FIG. 6 is a top view of the train of carts of the package sorting conveyor of the present inventions;

FIG. 6A shows the train of carts of FIG. 6, but with one of the carts in its tilted position and unloading a package onto an unloading station beside the sorting conveyor track;

FIG. 7 is a rear view of the tilting conveyor cart taken along lines 7-7 of FIG. 4 with the track rails and the roller structure omitted for clarity, which shows the conveyor cart in its upright, horizontal position;

FIG. 8 is a side elevational view of the pull-down mechanism of one embodiment of the inventions with its switch in an open position as it captures a passing cam follower on a conveyor cart actuating arm;

FIG. 8A is another side view of the pull-down mechanism, except with the cam follower traveling through the descending ramp and the switch in its closed position;

FIG. 9 is a top view of the pull-down mechanism with the switch in its open position, capturing a passing cam follower;

FIG. 9A is another top view of the pull-down mechanism, except with the cam follower traveling through the descending ramp and the switch in its closed position;

FIG. 10 is a top view of the push-up mechanism;

FIG. 10A is a side view of the push-up mechanism;

FIG. 11 is a cross sectional view showing the bi-directional actuator connected to the pivot switch;

DESCRIPTION OF EMBODIMENTS

Figure 1:
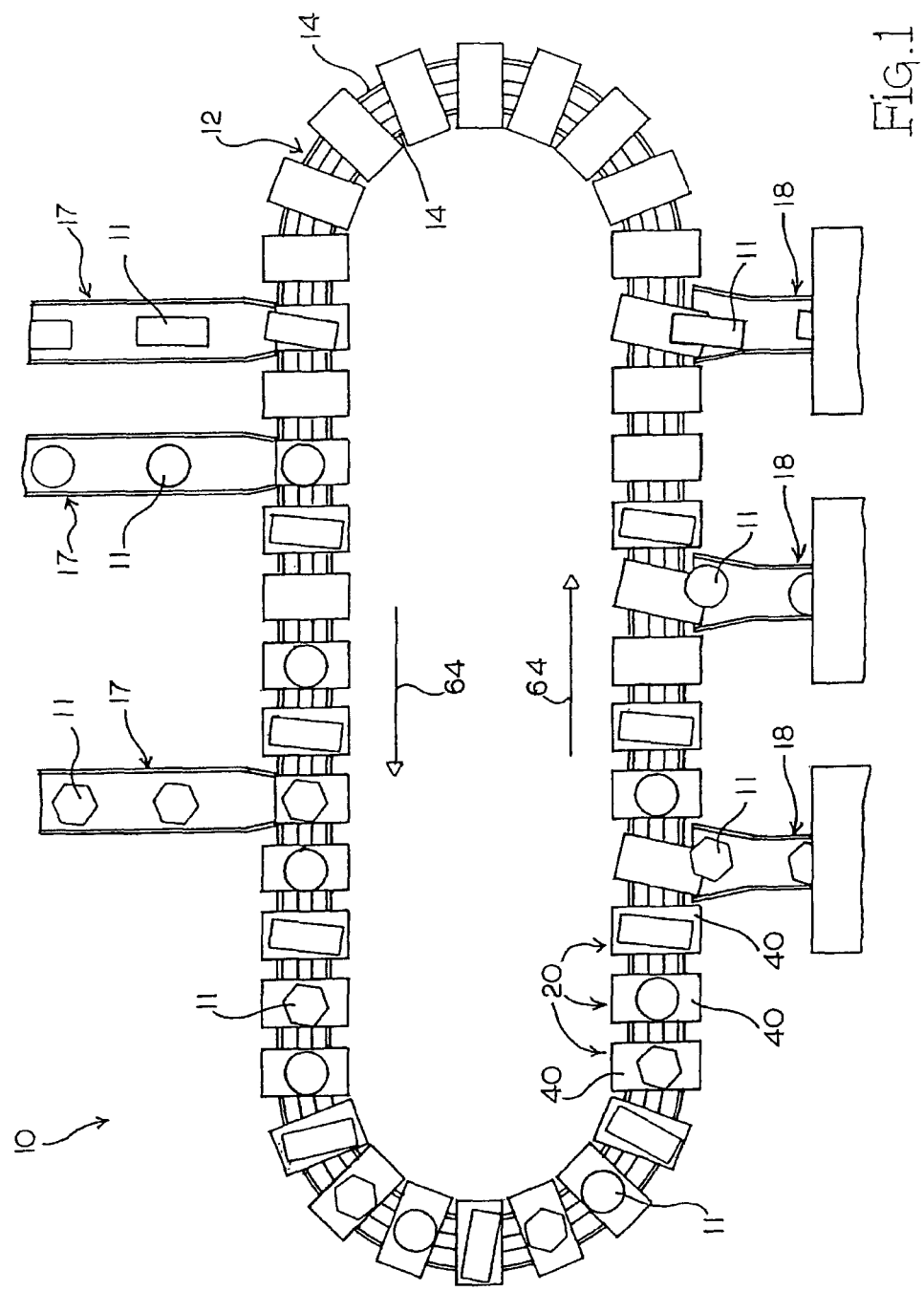
FIG. 1 is a schematic depiction of one embodiment of a package sorting conveyor constructed according to the present inventions.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the inventions and are not intended to limit any one of the inventions thereto. As seen in FIG. 1, a sorting conveyor, generally designated 10, is shown constructed according to the present inventions for transporting and sorting packages 11 or other objects. The sorting conveyor 10 comprises a train of individual carts 20, connected end to end, which may form an endless loop around a closed-circuit conveyor track 12. Alternately, the conveyor carts 20 of the inventions could be used singly or as part of a finite train.

The package sorting conveyor 10 generally includes four major sub-assemblies: a conveyor track 12; an opposed roller motor assembly 70; the train of tilting conveyor carts 20, which are moved along the conveyor track 12 by the opposed roller motor assembly 70; and a tilting mechanism 80 for tilting the conveyor carts 20 to discharge packages 11 therefrom. Typically, any number of unloading stations or outfeed chutes 18, which are adjacent the package sorting conveyor 10 on one or both sides thereof, receive the packages 11 discharged from the sorting conveyor 10 and carry the packages to waiting storage bins, trucks, etc. Packages may be manually placed on the conveyor carts 20 or may be delivered to the sorting conveyor 10 via infeed chutes 17 or the like.

The conveyor track 12 includes two parallel rails 14 and may be built to conform to the layout of any warehouse, shipping center, distribution center, or the like. Best seen as resembling the track of a roller coaster, the conveyor track 12 may be substantially horizontal or may ascend and descend. The conveyor track rails 14 may lie in the same horizontal plane, or one may be higher than the other, such as would be the case in a banked curve in the track 12. Banked curves are greatly advantageous because they allow the conveyor carts 20 to move around a curved conveyor track 12 at a much greater speed without spilling packages 11 than on a flat track. Typically, the rails 14 are generally tubular, again similar to a roller coaster, and are supported by rail support members 16 only on the outwardly facing edges of the rails. The rails 14 may be round or rectangular in cross-section. Rectangular cross-section is preferred since it has been found that round rails cause the cam followers to wear somewhat in their center because the load is not as well distributed as when rectangular rails are utilized.

Figure 2:
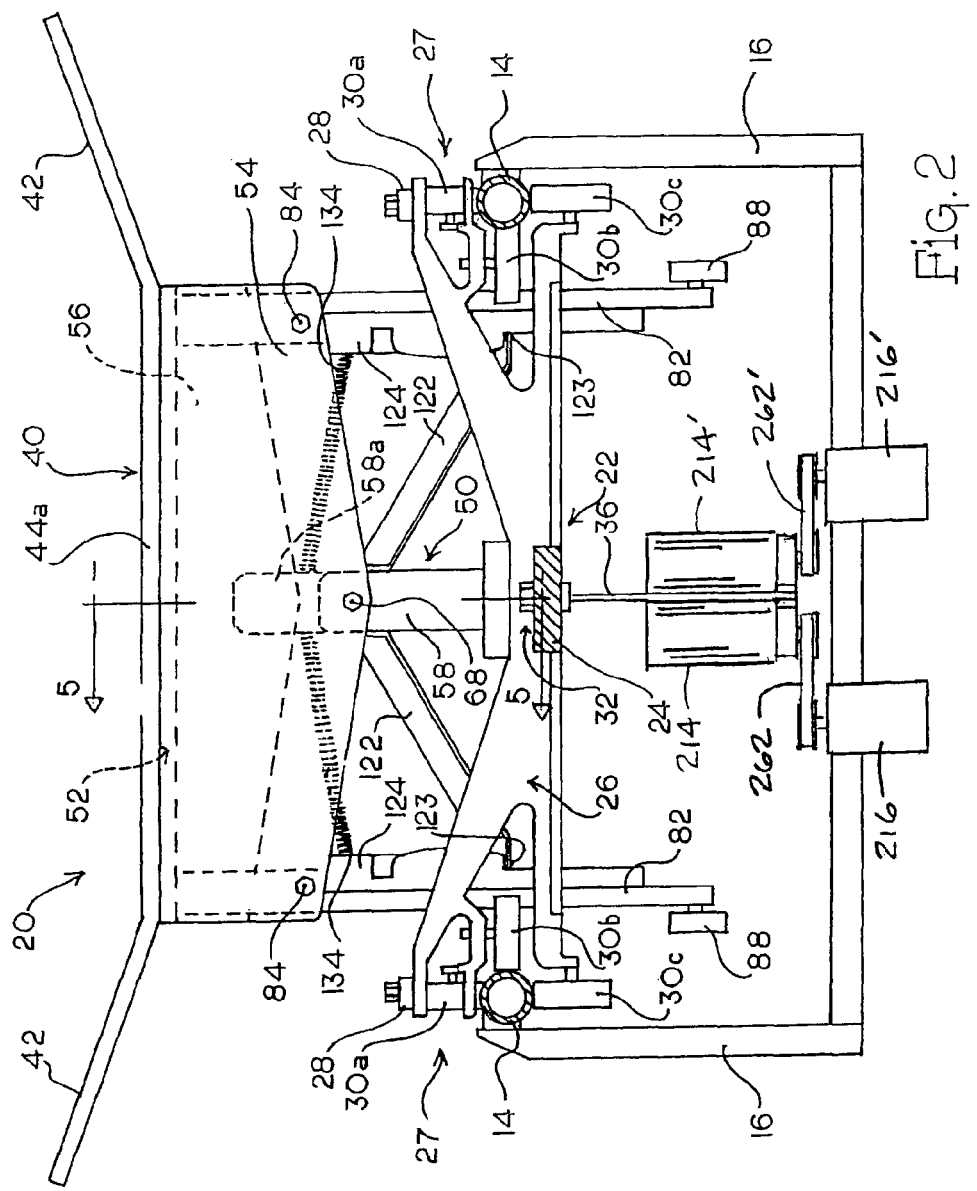
FIG. 2 is front, elevational view of a single tilting conveyor cart of a package sorting conveyor and an opposed roller motor assembly of the conveyor.
Figure 12:
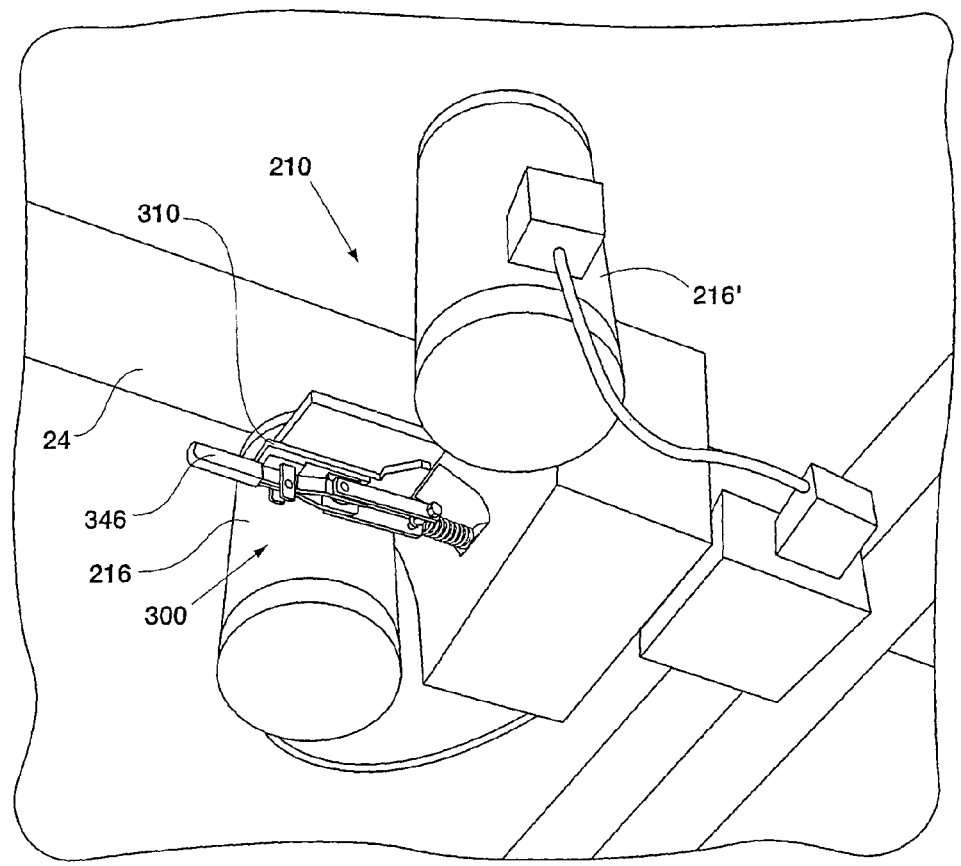
FIG. 12 is a bottom perspective view of the opposed motor roller assembly, with the track elements omitted for clarity.
Figure 13:
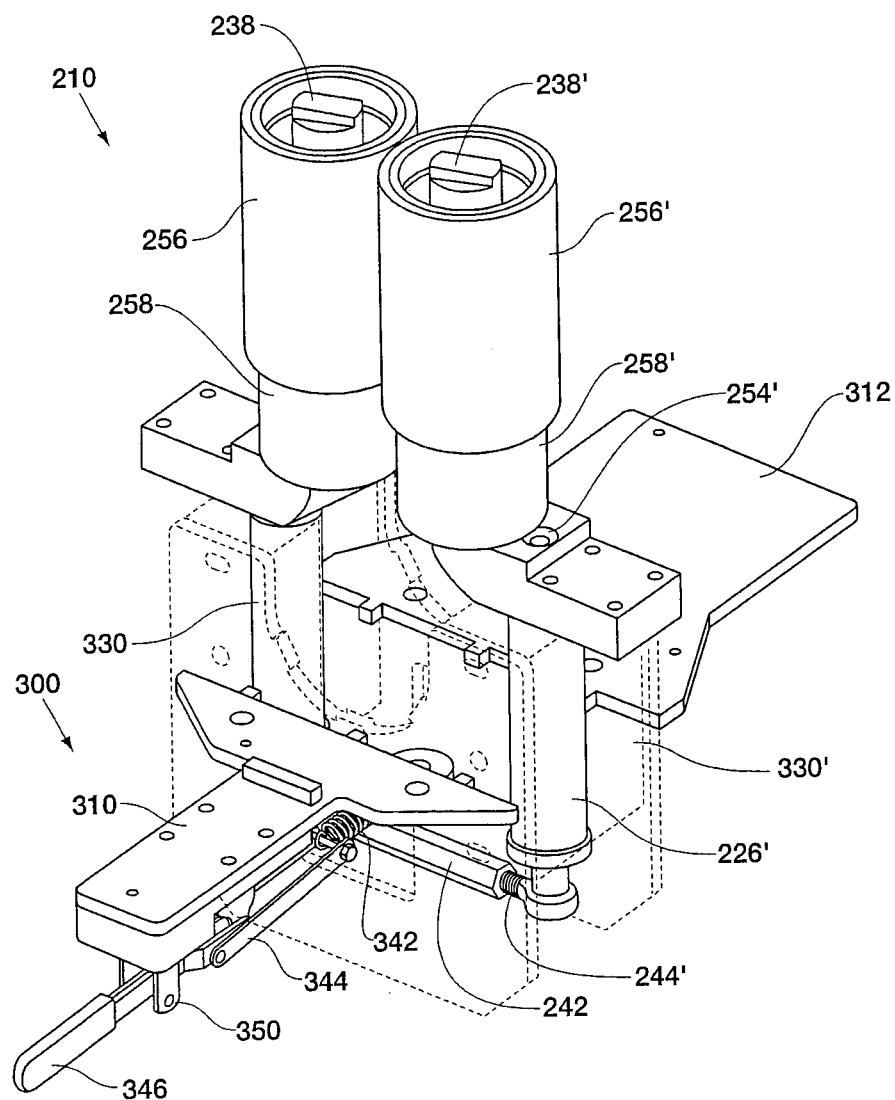
FIG. 13 is a perspective view of an isolated opposed motor roller assembly, with the elements shown in phantom and omitted for clarity.

The opposed roller motor assembly 210 of the sorter conveyor 10, which is shown in FIG. 2, may be a pair of opposed drive roller assemblies 214, 214' which is discussed in more detail in FIGS. 12 and 13. A driven fin 36, which is attached to the bottom of each conveyor cart 20, hangs between the two drive roller assemblies 214, 214'.

Figure 4:
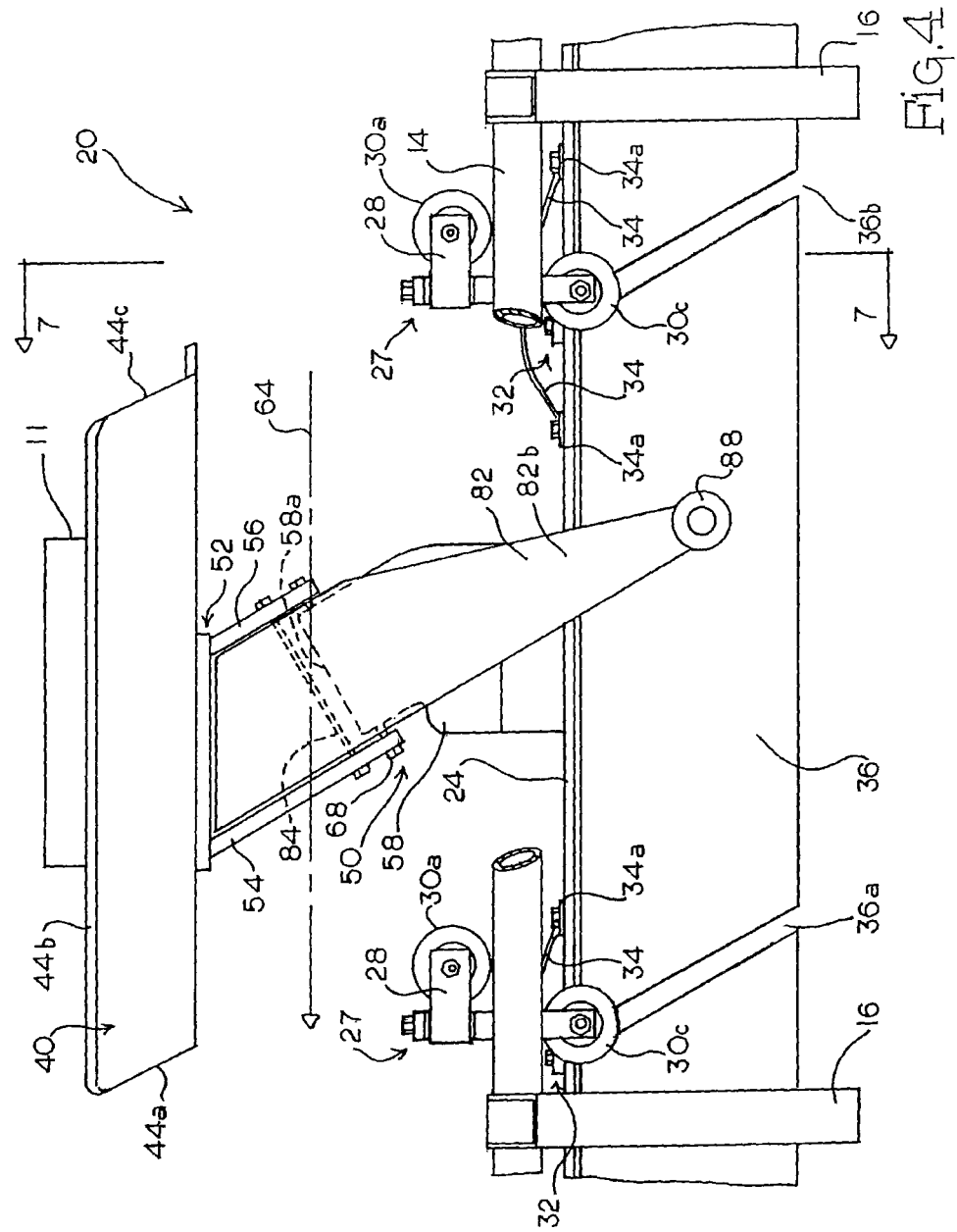
FIG. 4 is an elevational side view of one of the tilting conveyor carts of the present inventions.

Composed of semi-rigid, high coefficient aluminum or other conductive metal, the vertical fin 36 preferably has swept-back front 36a and rear 36b edges, as shown in FIG. 4, giving the fin 36 a generally parallelogram shape to reduce damage in the event the fin would contact a structure and to distribute the air gap over the length of the drive rollers to reduce noise and maintain more constant thrust. Specifically, because the gap is angled with respect to the roller, the roller does not hit the gap like a pot hole which is large enough for both wheels to hit at the same time.

Vertically orienting the fin 36 and the opposed roller assembly 210 also reduces problems with maintaining proper spacing between the fin 36 and the drive rollers, because gravity ceases to be a factor as the weight of the live load varies. This results in the fin 36 being easily maintained equidistant between the two drive rollers and re-centering in a mirroring fashion as discussed herein. The opposed roller motor assembly 210 ordinarily moves the train of conveyor carts 20 in one direction of travel; however, it can also be reversed if necessary to slow or stop the conveyor.

Figure 3:
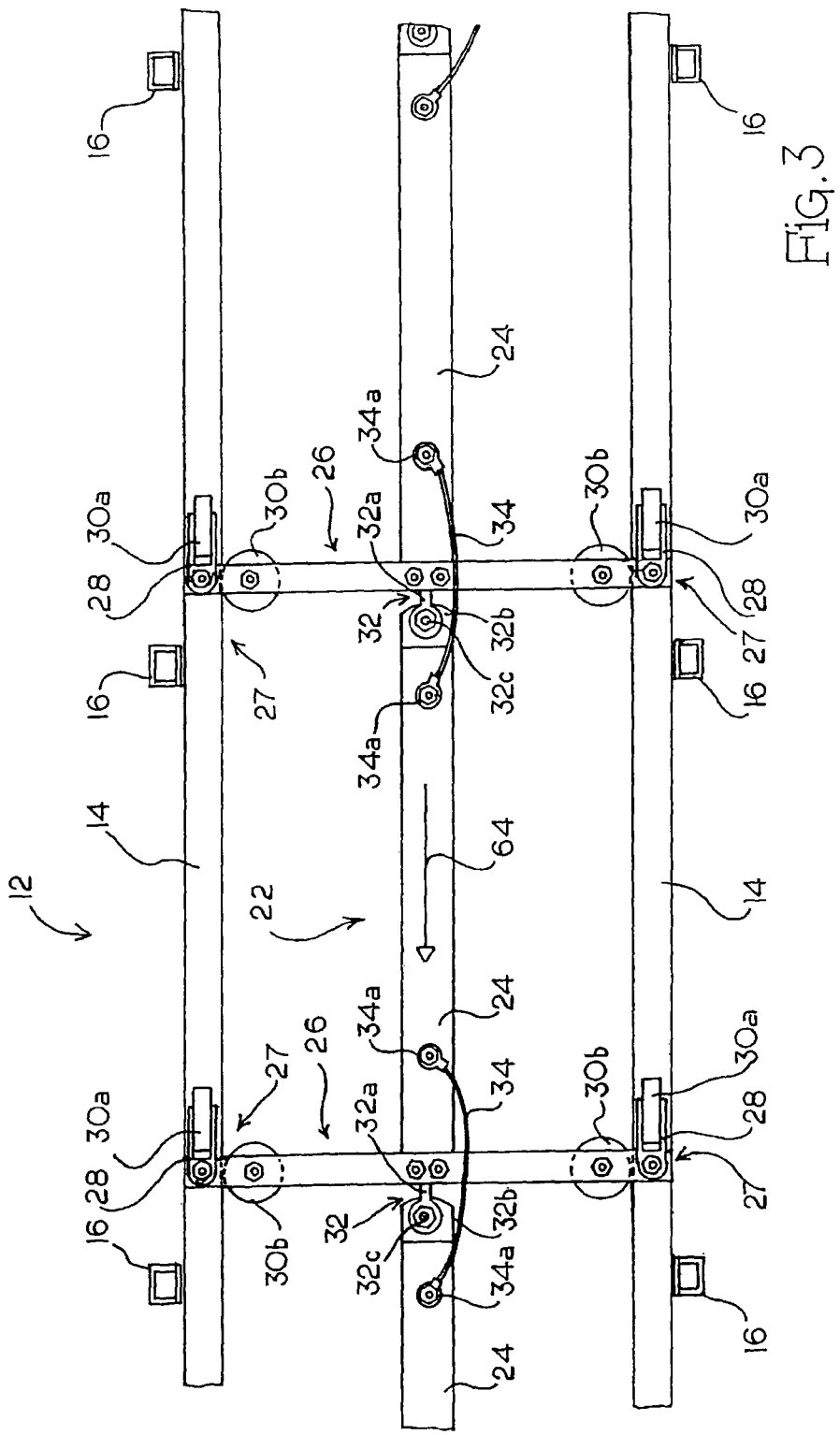
FIG. 3 depicts a train of trailer frame structures of the conveyor carts, as seen from the top, but with the tiltable support apparatuses and the carrying trays of the conveyor carts removed for clarity.

Now turning to the train of tilting conveyor carts 20, each cart 20 includes three major sub-assemblies, shown best in FIG. 2: a trailer frame structure 22, a generally horizontally disposed carrying tray 40 for holding the packages 11, and a tiltable support apparatus 50 for supporting the carrying tray 40 above the trailer frame structure 22 and for allowing tilting of the carrying tray 40 towards either side of the sorting conveyor 10 to unload a package into one of the unloading stations. Each cart 20 is built around a base trailer frame structure 22 to which other components of each cart 20 are mounted. As shown in FIG. 3, the trailer frame structure 22 includes a longitudinal base member 24 that extends in the rearward direction of conveyor travel 64 between the two parallel rails 14. Preferably, the base member 24 is substantially equidistant from each rail 14.

A roller structure 26 for riding on the conveyor track 12 is mounted on a front end of the base member 24 and includes two laterally extending cam follower mechanisms 27, one for each rail 14. The reason for the outboard placement of the rail supports 16 and the tubular shape of the rails 14 becomes apparent upon examining the cam follower mechanisms 27. Each cam follower mechanism 27 includes three cam followers: an upper cam follower 30a for riding on the top edge of the rail 14, a middle cam follower 30b for riding on an inside edge of the rail 14, and a lower cam follower 30c for riding on the bottom edge of the rail 14. With this configuration, it is almost impossible for a cart 20 to jump the track 12, because a wheel is provided for each directional force (sideways, upward, and downward) that a cart 20 may encounter when traveling along the track 12. Preferably, each cam follower 30a,b,c is constructed of a somewhat resilient material such as polyurethane to provide for smooth, quiet, relatively vibration-free operation of the sorter conveyor 10.

Figure 3A:
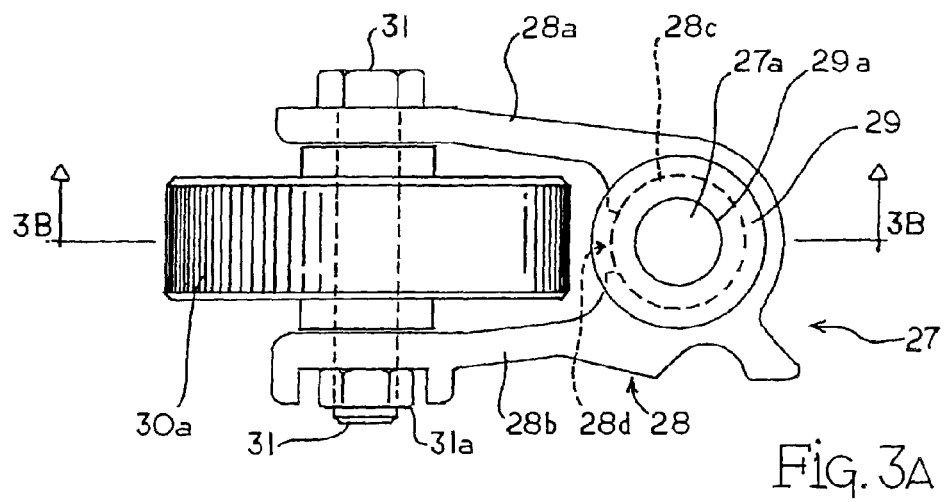
FIG. 3A depicts a top view of an axle caster that holds a cam follower on one of the conveyor carts.
Figure 3B:
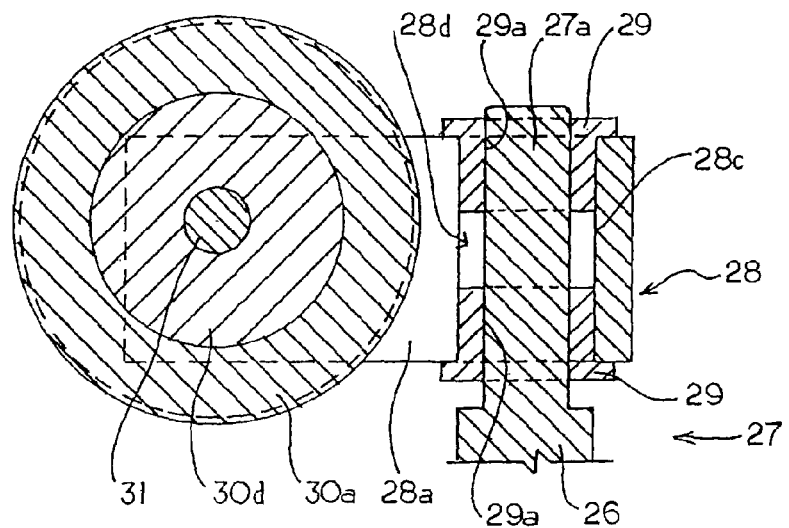
FIG. 3B is a cross-sectional view of the axle caster and cam follower of FIG. 3A, taken along lines 3B-3B.

Referring now especially to FIGS. 3A and 3B, the structure of each cam follower mechanism 27 that holds the top wheel 30a is shown in greater detail. Each top cam follower 30a is retained by an axle caster 28 that is preferably formed from extruded aluminum or the like. The axle caster 28 includes two forks 28a and 28b, one on each side of the wheel 30a, and a bearing bore 28c disposed at the juncture of the two forks 28a,b, which has an opening 28d on one side so that the bearing bore 28c communicates with the space between the forks 28a,b. A pair of flange bearings 29 seated in the bearing bore 28c are disposed around an axle shaft 27a extending from the roller structure 26. Preferably formed of "oilite" or other friction-reducing material, each flange bearing 29 has the form of a top-hat bushing and includes a center hole 29a through which passes the axle shaft 27a. The cam follower 30a is held in place between the two forks 28a,b by a bolt 31 and nut 31a. Preferably, the cam follower 30a includes a bearing structure 30d disposed around the bolt 31, which serves as an axle running through the center of the wheel 30a.

The axle caster 28 of the present inventions provides that the flange bearings 29 can easily be slid into place by hand into the bearing bore 28c without using a press. Then, to immovably secure the flange bearings 29 inside the bearing bore 28c, the forks 28a,b are slightly flexed inwardly towards each other as the nut 31a is tightened onto the bolt 31 to hold the wheel 30a in place. The forks 28a,b of the axle caster 28 are therefore formed minutely wider apart than would be necessary to merely hold the wheel 30a. When the forks 28a,b are flexed inwardly towards each other by tightening the nut 31a on the bolt 31, the opening 28d of the bearing bore 28c is closed somewhat and the bearing bore 28c is itself slightly distorted, securely retaining the flange bearings 29 therein. The flange bearings 29 themselves are, however, not significantly distorted and are free to swivel back and forth on the axle shaft 27a. Therefore, the flange bearings 29 can easily and immediately be replaced on-site when worn, eliminating much down-time that would be required if conventionally designed axle casters were used in the conveyor cart 20 of the present invention.

Adjacent carts 20 in the train are connected together using hitch mechanisms 32. Each hitch mechanism 32 is shown in FIGS. 3 and 4 as including a front hitch 32a mounted on the front end of the base member 24 in front of the roller structure 26 and a rear hitch 32b mounted on the rear end of the base member. In the embodiment disclosed, each hitch 32a,b has a vertical throughbore, through which a hitch pin connector 32c is inserted. The hitch mechanisms 32 may be configured so that the front hitch 32a on a rearward cart is disposed overtop of the rear hitch 32b on a forward cart. In the alternative, the hitch mechanisms 32 may comprise a poly-directional spherical ball joint mechanism similar in structure to an automotive trailer hitch. In either case, friction between hitch mechanism components is preferably reduced by, for example, lining the hitch components with TEFLON or other relatively friction-free material.

To prevent adjacent conveyor carts 20 from separating should the hitch mechanism 32 accidentally break or become uncoupled, an auxiliary cart connector 34 is preferably connected between the trailer frame structures 22 of adjacent carts 20. The auxiliary cart connector 34 may be a metal cable or lanyard, although other high-tensile strength materials could be used. In the embodiment depicted, the auxiliary cart connector 34 is an approximately 3/16th inch thick metal cable connected to adjacent trailer frame structures 22 with metal mounting connectors 34a.

The primary reason that metal is the preferred material for the auxiliary cart connector 34, besides its strength, is so that the auxiliary cart connector 34 will also serve as a continuous electrical connector between adjacent carts 20. Electrical continuity between carts 20 is important because of static electricity build-up while the carts 20 are traveling around the conveyor track 12. However, because the cam followers 30a, b,c are preferably formed of polyurethane (an electrical insulator) and because the components of the hitch mechanism 32 are preferably coated with TEFLON (also an electrical insulator), electrical continuity between adjacent carts 20 would not otherwise be effectively achieved. By electrically connecting the carts 20, static charges can be bled off from the train, which is important for safety and operational considerations. Thus, the auxiliary cart connector 34 serves two purposes: first, it physically attaches two adjacent conveyor carts 20 and prevents them from becoming completely separated should the hitch mechanism 32 fail; second, it enables electrical continuity among all of the conveyor carts 20 in the train.

Even without the auxiliary connector cable 34, only the rear end of the trailer frame structure 22 will drop below the conveyor track 12 upon accidental disengagement of the hitches 32a,b or upon breakage of the hitch mechanism 32. Therefore, instead of the front end 36a of the driven fin 36 digging into the floor sides or underlying structures below the conveyor, as is the case with prior art conveyors, the driven fin 36 will simply be dragged with relatively minimal damage should one of the hitches 32 break or become accidentally uncoupled. If an auxiliary connector cable 34 is attached between two adjacent carts 20 that break apart, the connector cable 34 will limit the distance that the rear end of the trailer frame structure 22 will drop, further limiting damage.

Mounted atop the trailer frame structure 22 of each conveyor cart 20 is the tiltable support apparatus 50, which supports the carrying tray 40 thereabove. As can best be seen in FIG. 5, the tiltable support apparatus 50 generally includes three components: an upper support structure 52 joined to a bottom surface of the carrying tray 40, a lower support structure 58 centrally mounted atop the longitudinal base member 24, and an angled pivot structure 60 pivotally connecting the lower support structure 58 to the upper support structure 52 along a pivot axis 62.

In turn, the upper support structure 52 includes a front support member 54 and a back support member 56. The lower support structure 58 may be generally planar, lying in the vertical plane parallel to the conveyor line of travel 64, and includes an angled upper edge 58a. The pivot structure 60 may include an axle 68 that runs either through or along the upper edge 58a of the lower support structure 58 and is connected to the front and back support members, 56, 58, respectively. The axle 68 may run through lower regions of the front and back support members 56, 58. As can be seen, the front support member 54 depends farther down from the carrying tray 40 than the back support member 56. While the lower support structure 58 is stationarily fixed to the trailer frame 22, the axle 68 allows the upper support structure 52 to pivot along the pivot axis 62 of the pivot structure 60.

In an alternate embodiment of the tiltable support apparatus (not shown), the upper support structure 52 could also comprise, like the lower support structure 58, a generally planar member that lies in the vertical plane parallel to the conveyor line of travel 64. In this case, the angled pivot structure 60 could take on the form of a hinge structure joining together the two generally planar support structures 52, 58.

The pivot axis 62 lies in a vertical plane parallel to the conveyor line of travel, which is shown in the drawings as horizontal line 64. However, unlike conventional sorter conveyor tilting carts, the pivot axis 62 of the conveyor cart 20 of the invention is disposed at an angle θ to the conveyor line of travel 64 so as to impart two axial components to the tilting of the carrying tray 40. Preferably, the pivot axis 62 is angled downwardly at an angle of approximately 20 to 45 degrees below horizontal in a forward direction. In the embodiment disclosed, the pivot axis 62 is angled downwardly 30 degrees. As can be seen in FIG. 5, the pivot axis 62 preferably intersects a plane occupied by the carrying tray 40 rearward of the center of the tray 40.

By disposing the pivot axis 62 at a downwardly directed angle θ instead of parallel to the conveyor line of travel 64, two axial components are imparted to the tilting motion of the carrying tray 40. The first axial component of the tray's tilting motion is lateral tipping on a horizontal axis parallel to the conveyor line of travel 64. The second axial component of the tray's tilting motion is rotating around a vertical axis 66 perpendicular to the conveyor line of travel. Thus, while the tray only tilts along a single, angled pivot axis 62, the overall motion of the tray 40 as it tilts includes two axial components.

The tilting motion of the tray may also be described using three-dimensional X, Y, and Z-axis spatial coordinates, as shown in FIG. 5A, wherein the Y-axis is parallel to the conveyor line of travel 64, the X-axis extends horizontally perpendicular to the line of travel 64, and the Z-axis extends vertically perpendicular to the line of travel 64. In the present invention, tilting of the tray 40 includes a Y-axis and a Z-axis component, for as shown in FIG. 5A the pivot axis 62 intersects the Y and Z axes. Specifically and for illustrative purposes only, using the preferred 37.5 degree downward angle θ of the pivot axis 62, it can be appreciated that the ratio of Y-axis motion to Z-axis motion is 60 30. In other words, with a 30 degree angle θ, the tray 40 laterally tips somewhat farther than it rotates. If the angle θ of the pivot axis 62 is increased to 45 degrees below horizontal, then the tray will tilt and rotate equally.

As shown in FIGS. 6 and 6A, one effect of this two-axis tilting of the carrying tray 40 is that a side 44b of the tray that is tilted downwardly also rotates rearwardly relative to the cart 20, as shown in FIG. 6A by line 46a. Side 44d of the tray, which is tilted upwardly, rotates forwardly relative to the cart 20, as shown in FIG. 6A by line 46b. The pivot axis 62 may intersect the plane occupied by the tray 40 rear-of-center, the front side 44a of the tray 40 rotates a greater distance around the vertical axis 66 than the back side 44c of the tray 40, upon tilting of the tray 40. As shown in FIG. 6A, the bisecting center line of the tray 40 rotates farther at its forward end from the horizontal line of travel 64 than at its rearward end. Thus, front side rotation line 48a follows a longer arc than back side rotation line 48b. By rearwardly rotating whichever side of the tray 40 is being tilted downwardly, some rearward velocity is imparted to packages 11 as they are being discharged from the cart 20 of the invention into an unloading station 18. Thus, packages are discharged at a lower velocity relative to the unloading station than the velocity of the train of conveyor carts as a whole. This enables the packages to be discharged into a narrower chute than could be accomplished using a conventional conveyor cart. Additionally, because the packages are slowed down somewhat as they are discharged, there is less potential for damage to occur.

As can be seen in the drawings, the tray 40 may also include upwardly angled lateral wings 42 to help prevent packages 11 from accidentally falling off the tray 40. These wings 42 also decrease the angle of the slope created when the tray 40 is tilted, which helps with gentle handling of the packages 11 as they are discharged from the cart 20.

When a carrying tray 40 reaches a particular destination unloading station 18, the tilting mechanism 80 tilts the carrying tray 40 to cause a package 11 carried thereon to be discharged into the unloading station 18. The tilting mechanism 80 generally includes components mounted on each conveyor cart 20 and components associated with each unloading station 18. First is a pair of actuating arms 82 attached beneath each cart's carrying tray 40 on opposite lateral sides thereof, one actuating arm 82 on each side of the cart's tiltable support apparatus 50. Second is a pull-down mechanism 90 immediately upstream from each unloading station 18. The pull-down mechanism 90, when activated, selectively pulls down one of the actuating arms 82 and thereby pulls the respective side of the tray 40 downwardly and rearwardly into the biaxially tilted position described above. Third is a push-up mechanism 110 downstream of the unloading station 18, which pushes up the actuating arm 82 pulled down by the pull-down mechanism 90 and thereby reorients the tray 40 into its normal, upright position. Fourth is a locking structure 120, which locks the carrying tray 40 in the tilted position upon pulling down of one of the actuating arms 82, and which also locks the carrying tray 40 in its normal, upright position upon pushing up of that actuating arm 82.

Figure 7A:
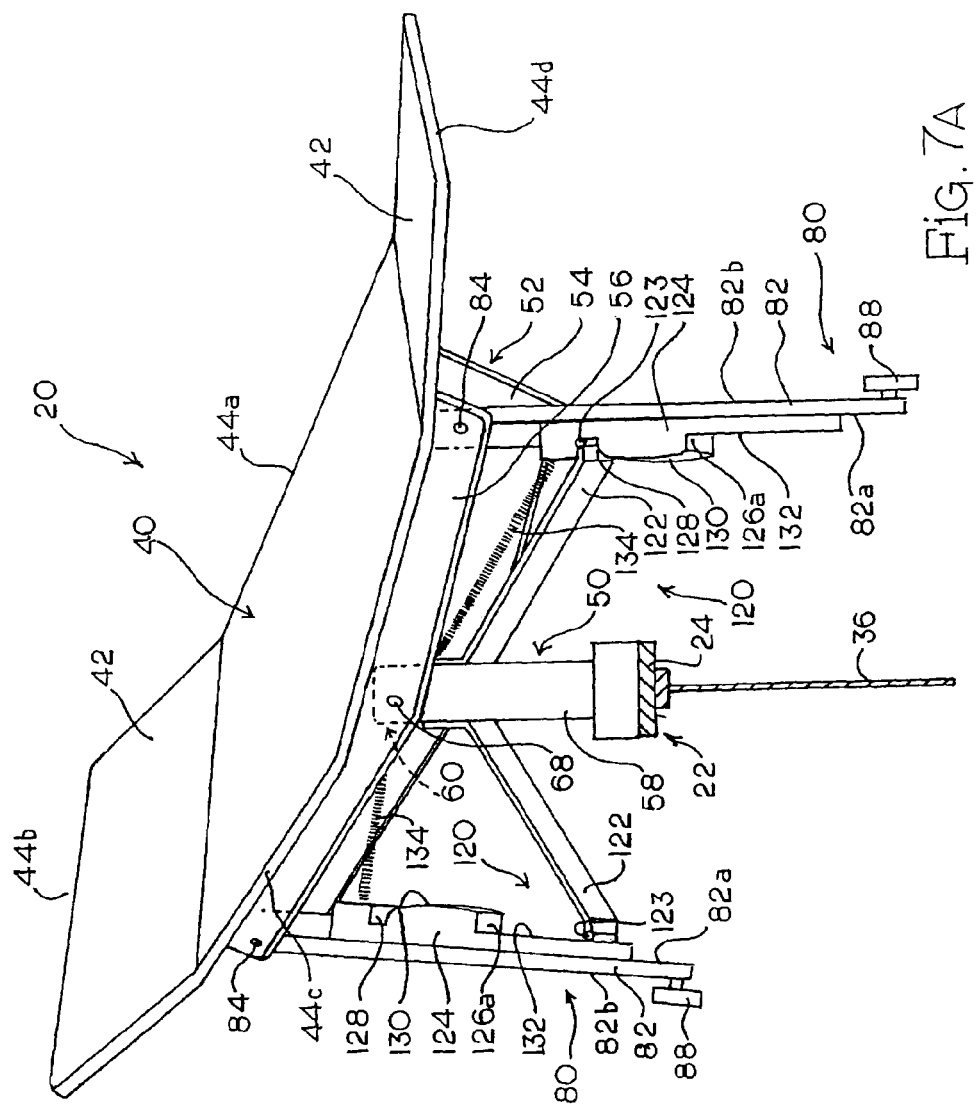
FIG. 7A shows the tilting conveyor cart of FIG. 7 in its tilted position.

Referring now to FIGS. 7 and 7A, each actuating arm 82 is pivotally attached to the underside of one side of the carrying tray and is preferably connected to the front and back support members, 54 and 56 respectively, of the upper support structure 52. In the embodiment shown, the actuating arm 82 is attached to the front and back support members by an angled pivot hinge axle 84 that runs through both support members 54, 56 and through the upper end of the actuating arm 82. The actuating arm 82 therefore pivots on a pivot axis 86 that is preferably parallel to the pivot axis 62 of the tiltable support apparatus 50, as shown in FIG. 5. As can be seen from an examination of the drawings, the actuating arms 82 and their respective pivot axes 86 remain substantially in a vertical plane parallel to the conveyor line of travel 64 when stationary and when being pulled down or pushed up.

Each actuating arm 82 also includes a cam follower 88, which engages the pull-down and push-up mechanisms 90, 110, as will be described below. The cam follower 88 is preferably mounted on the lower end of the actuating arm 82 on an outer surface 82a thereof. It is conceivable, however, that the cam follower 88 could be replaced with a friction reducing slide block or other protrusion for engagement by the pull-down and push-up mechanisms 90, 110.

Seen in detail in FIGS. 8, 8A, 9, and 9A, a pull-down mechanism 90 is associated with each unloading station 18 and is located beneath the rail 14 running closest to the unloading station 18 on the upstream side thereof, as indicated in FIG. 6A. The pull-down mechanism 90 includes a descending ramp 92 and a laterally pivoting switch 94 that, when actuated, pivots open and directs the cam follower 88 of a passing actuating arm. 82 into the descending ramp 92. As can be seen in the drawings, when the switch 94 is not actuated, the switch is in a closed position parallel to the ramp 92, and the cam follower 88 is free to bypass the switch and the descending ramp 92. However, when a particular package 11 arrives at its destination unloading station 18, the switch 94 is automatically actuated so that it pivots open into the path of the passing cam follower 88, capturing the cam follower 88. The cam follower 88 then rolls through the switch 94, causing the actuating arm 82 to pivot outwardly somewhat, and into the descending ramp 92. As the cam follower 88 rolls through the switch 94, the cam follower 88 engages a closure flange 104 and enters the descending ramp 92. Next, the descending ramp 92 forces the cam follower 88 and the associated actuating arm 82 downwardly so as to pull down one side of the tray 40, thereby discharging the package from the tray 40 into the unloading station 18 adjacent the pull-down mechanism 90.

A computer controller (not shown) is used to track all packages 11 moving on the conveyor 10 and to automatically actuate a switch 94 at the appropriate time when a particular package 11 reaches its destination unloading station or outfeed chute 18. The computer is also connected to the opposed roller motor assembly 210 to control the movement of the conveyor train and maintain a desirable rate of speed.

The pivot switch 94 is attached to a bi-directional actuator 150 as shown in FIGS. 8 and 8A. The bi-directional actuator is mounted below the pivot switch 94 away from the moving cam followers. As shown in FIG. 11, the bi-directional actuator 150 includes a coaxial arm 152 extending from an actuator motor 154 and connected to the interior of the pivot switch 94.

The actuator motor 154 rotates the coaxial arm 152 and the attached pivot switch 94 between the open position to capture the cam follower 88 and the closed position to allow the cam follower to bypass the unloading station. Power and communication means with the conveyor system is supplied to the actuator motor 154 via a cord 160. To rotate the coaxial arm to an open position, power is continuously applied to the motor to maintain the pivot switch in the open position. When power is turned off, a coil spring positioned inside the actuator motor 154 biases the arm causing the pivot switch to rotate to the closed position. This combination of powered on and powered off enables the pivot switch to be controlled independently of the movement of the cam followers. In one embodiment, the actuator motor is a 500 Model 40R10102-10-11 rotary solenoid actuators ("the model 40R actuators") from Ram Manufacturing Company, Inc. The actuator motor 154 is mounted within a heat sink 172.

As best seen in FIG. 11, an outer clevis 162 surrounds the actuator arm 152 and is mounted between an upper bracket 164 and a lower bracket 166. The outer clevis 162 is mounted to a lower body 174 that is aligned substantially perpendicular to align with the lower bracket 166. Connector means such as screw or bolts mount extend through the lower bracket 166 and lower body 174 to secure the bi-directional actuator to the tipping mechanism. The outer clevis 162 is sized larger than the actuator 152 such that as the arm rotates, the clevis maintains a fixed position. A roll pin 170 extends through the actuator arm 152 and outer clevis 162 and into the interior of the pivot switch 94. The roll pin 170 is fixedly attached to the actuator arm 152 such that the rotation of the actuator arm moves the pin which thereby moves the pivot switch through the open and closed positions. The roll pin extends through apertures within the outer clevis such that the pin has a free range of movement.

The outer clevis 162 and upper bracket 164 and lower bracket 166 protect the actuator arm 152 from stresses applied to the pivot switch 94. The outer clevis 162 allows for the pivot switch to pivot about the clevis, but prevents the pivot switch from moving in a linear direction which could damage the actuator arm.

In use, the actuator motor 154 is energized thereby rotating the actuator arm 152 causing the pivot switch to rotate to the open position. The next passing cam follower will be captured by the pivot switch and diverted into the unloading station path. After the cam follower has been captured, power to the actuator motor 152 will be stopped causing the inner coil spring to bias the pivot switch in the closed position. However, while the cam follower is running along the length of the pivot switch, the force of the wheel will maintain the switch in the open position. Once the cam follower has passed downstream of the pivot point, the pivot switch will rotate to a closed position by the biasing of the internal coil spring.

This arrangement provides for the pivot switch to be maintained in an open position for the shortest duration thereby allowing the speed of the sorter conveyor to be increased over previous designs without the problem of the switch inadvertently remaining open and catching the next passing cam follower thereby starting the cascade effect. Powering down the pivot switch to the closed position will also remove inadvertent captures such as when a cam follower is missing from the actuating arm or if the cam follower were to jump the pivot switch without entering the unloading station. Previously available designs depended upon the cam followers passing along the pivot switch to rotate the pivot switch to the closed position.

After the carrying tray 40 has been tilted and a package carried thereon has been discharged into an unloading station 18, the carrying tray is reoriented into its normal upright position by the push-up mechanism 110. Seen best in FIGS. 10 and 10A, a push-up mechanism 110 is associated with each unloading station 18 and is located beneath the track 12 adjacent the unloading station 18 on the downstream side thereof, as indicated in FIG. 6A. Each push-up mechanism 110 includes an ascending ramp 112 below the rail 14 adjacent the unloading station 18. The push-up mechanism 110 also includes a wedge-shaped frog 114 that engages the cam follower 88 on a pulled-down actuating arm 82 and directs the cam follower 88 into the ascending ramp 112. The frog 114 is positioned low enough below the track 12 so that cam followers 88 will be engaged and directed into the ascending ramp 112 only if they have already been pulled down by the pull-down mechanism 90. As the cam follower 88 is directed into the ascending ramp 112, the actuating arm 82 is pivoted outwardly somewhat so that the outside edge 123 of the locking flange 122 will disengage from the tilted position locking channel 127. To help pull the actuating arm 82 back into substantially vertical alignment after the locking flange 122 has slid over the slide surface 130, the top of the ascending ramp 112 includes an inwardly turned section 116.

Now turning to the locking structure 120 of the tilting mechanism 80, it can be seen best in FIGS. 7 and 7A that the locking structure 120 includes a pair of locking flanges 122, a pair of locking blocks 124 mounted one each to the actuating arms 82, and a biasing member 134 for biasing the actuating arms 82 inwardly into a locked position. Preferably, the locking flanges 122 laterally extend from both sides of the lower support structure 58 of the tiltable support apparatus 50, although they could also be mounted to the trailer frame structure 22. In the embodiment disclosed, the locking flanges 122 comprise generally planar steel plates having rollers 123 mounted to their outer edges 123. In an alternate embodiment, the rollers 123 could be eliminated and the locking blocks 124 made of a low-friction material on which the roller-less outer edges of the locking flanges 122 could easily slide.

Each locking block 124 is mounted to an inner surface 82a of the actuating arm 82 and includes two locking channels 126 and 134 separated by a cammed section 130 having a generally convex outer surface. The lower 126 of the two locking channels receives the roller 123 at the outer edge of the lateral locking flange 122 when the carrying tray 40 is in its upright position. The upper 134 of the two locking channels receives the roller 123 when the carrying tray 40 is in its tilted position. As the tray 40 is tilted from one position to the other, the roller 123 rolls over the cammed section 130 interposed between the two locking channels 126, 134. Preferably, the locking blocks 124 are made of a wear-resistant material such as plastic, although other materials could be used. The biasing member, which may be a spring 134, pulls the actuating arms 82 inwardly so as to engage the locking structure 120 by seating the locking flanges 122 in one of the locking channels 126, 134.

During tilting of the tray 40 by the pull-down mechanism 90, the actuating arm 82 being pulled down is pivoted outward slightly on the pivot axis 86 as the cam follower 88 is captured by the switch 94 and directed into the descending ramp 92. This outward pivoting of the actuating arm 82 causes the upright position locking channel 126 to disengage from the locking flange 122. Then, as the cam follower 88 is pulled down by the descending ramp 92, the locking flange 122 rolls upwardly over the cammed section 130. Because of the curved, convex shape of the cammed section 130 of the locking block 124, the actuating arm 82 remains substantially vertical as it is pulled down. This helps prevent the cam follower 88 from slipping out of the descending ramp 92 of the pull-down mechanism 90. Eventually, the locking flange 122 is seated in the tilted position locking channel 134 as the wheel exits the descending ramp 92 and the tray 40 reaches its fully tilted position. The degree to which the tray 40 is tilted in the fully tilted position can vary depending on the configuration of the locking blocks 124 and the pull-down mechanism 90. However, in the embodiment disclosed, the tray 40 is tilted approximately 37.5 degrees from horizontal in the fully tilted position.

The biasing member 134 holds the tilted position locking channel 134 and the locking flange 122 together while the cart 20 is moving past the unloading station 18, stabilizing the tray 40 in the tilted position. Then, when the downwardly pulled actuating arm 82 reaches the push-up mechanism, the arm 82 is pivoted outwardly by the wedge-shaped frog 114 engaging the cam follower 88. This outward pivoting causes the locking flange 122 to disengage from the tilted position locking channel 134. As the cam follower 88 moves up the ascending ramp 112, the locking flange rolls downwardly over the cammed section 130. As the inwardly turned top end 116 of the ascending ramp 112 pivots the actuating arm 82 back to its vertical orientation, the locking flange 122 seats in the upright position locking channel 126, where it is held in place through the action of the biasing member 134.

The actuating arm 82 on the opposite side of the conveyor cart 20, which is not being pulled down or pushed up at a particular unloading station 18, simply rises and falls with the side of the tray 40 to which it is attached. The locking flange 122 on this side of the cart 20 simply rolls over a flat section 132 of the locking block 124 below the upright position locking channel 126.

In an alternate embodiment (not shown) of the package sorting conveyor 10 of the invention, the conveyor cart 20 could include a tiltable support apparatus having a pivot axis that is not angled downwardly but that is generally parallel to the conveyor line of travel 64. In this case, the tilting motion of the carrying tray 40 would only have a single axial component—lateral tipping on a horizontal axis parallel to the conveyor line of travel 64. While package sorting conveyors having a single-axis lateral tipping motion have been designed in the past, they do not include the other inventive features of the present sorting conveyor 10 such as the vertically oriented opposed roller motor assembly 210, the hitch mechanism 32 and auxiliary cart connector 34, and the tilting mechanism 80 with its associated components. However, for many applications, a single axis tiltable cart will be sufficient.

Such single-axis conveyor carts would primarily be incorporated into the package sorting conveyor 10 of the present invention for use in sorting particularly large packages that must be carried by two or more adjacent carrying carts 20. In this case, the trays of the adjacent carts could be simultaneously tilted as the carts reached an unloading station to discharge the package. This would also of course require an especially wide outfeed chute as well as a pull-down mechanism adjacent the unloading station for each cart to be simultaneously tilted.

The reason that single-axis conveyor carts are especially useful for sorting large packages is that it has been found that this double (or triple, etc.) unloading of particularly large packages using the two-axis carrying carts 20 of the present invention occasionally presents difficulties due to the carrying trays 40 not being in the same spatial plane when they are both in their fully tilted positions. Therefore, for double unloading, it is preferable to use the alternate, single-axis embodiment of the conveyor cart.

Several configurations of the package sorting conveyor 10 may be employed that utilize the alternate, single-axis conveyor carts for double unloading situations. A preferable configuration would comprise two adjacent single-axis carts for carrying a single large package. A second configuration would comprise a leading two-axis conveyor cart 20 and a trailing single-axis cart. A third configuration would comprise a leading single-axis conveyor cart and a trailing two-axis conveyor cart 20. As a whole, the package sorting conveyor 10 of the invention may include both two-axis conveyor carts 20 as well as single-axis conveyor carts interspersed among each other depending on a particular facility's conveying and sorting requirements.

In one exemplary embodiment, the opposed motor roller assembly 210 of the present inventions is comprised of a pair of support frames 212, 212', a pair of opposed drive roller assemblies 214, 214', and a pair of motor assemblies 216, 216'. The second drive roller assembly 214' provides the opposing surface 220 that exerts pressure in conjunction with the first drive roller 214 on the driven fin 36 of the cart 20.

As shown in FIG. 12, opposed motor roller assembly 210 and self-tensioning adjustment assembly 300 generally tie movement of the rollers together. For instance, as one roller moves closer, or away, from the driven fin, the opposing roller mirrors the first rollers' movement. Thereby, the drive rollers contact the driven fin simultaneously from each side to be self-centering. Typically, the opposed roller motor assembly 210 may include a cantilevered, drive roller that is connected to first pivot block assembly 330 and second pivot block assembly 330' (see FIG. 13) to position the drive roller. The pair of motor assemblies 216, 216' may be mounted on respective pivot block assemblies 330, 330' and are connected to the shafts of motor assemblies 216, 216', for instance with drive belts 262, 262'. Further, self-tensioning adjustment assembly 300, as shown in FIG. 12, is generally affixed to the base, and includes self-tension clamp plate weldment 310 to position the pivot block assemblies about a centered position relative to self-tensioning adjustment assembly 300.

Self-tensioning adjustment assembly 300 generally maintains opposed motor assembly 210 in perpendicular contact with the driven fin. For instance, self-tensioning adjustment assembly 300 minimizes, or prevents, twisting as the driven fin moves from one drive roller to another. Additionally, self-tensioning adjustment assembly 300 maintains each drive roller in a neutral position with respect to the driven fin and the corresponding guide wheels as discussed herein. In this manner, the guide wheels will not comprise the reactive pressure of each drive roller.

As shown in FIG. 12, lever arm 346 is connected to self-tension clamp plate weldment 310 to allow adjustment of the two pivot block assemblies. As illustrated, lever arm 346 may adjust both first pivot block assembly 330 and second pivot block assembly 330'. In other examples, the first pivot block assembly 330 and second pivot block assembly 330' may be coupled together with the self-tensioning adjustment assembly 300, for instance so that movement of each pivot block assembly mirrors movement of the opposing pivot block assembly about a centered position.

FIG. 13 shows one embodiment of an isolated opposed motor roller assembly 210 that is connected to first pivot block assembly 330 and second pivot block assembly 330'. First pivot block assembly 330 and second pivot block assembly 330' position drive roller 210 adjacent to one surface of the extended driven fin. A pair of support frames and the base are attached to the conveyor track 12 (see FIG. 1 or 3 for track 12 and base 222) and self-tensioning assembly 300. Typically, self-tensioning assembly 300 is connected to the base through a weldment, for instance drive clamp plate 310 as illustrated in FIG. 13. Similarly, a second weldment, for instance a drive clamp plate 312 as introduced in FIG. 13, may secure the first pivot block assembly 330 and/or second pivot block assembly 330'.

Pivot block assemblies 330, 330' may be further connected forward of the first shafts 226, 226' with a compression linkage 242. In this particular embodiment, the first end 244 of compression linkage 242 is connected to pivot block assembly 330, which the second end 244' of compression linkage 242 is connected to pivot block assembly 330'.

Figure 14:
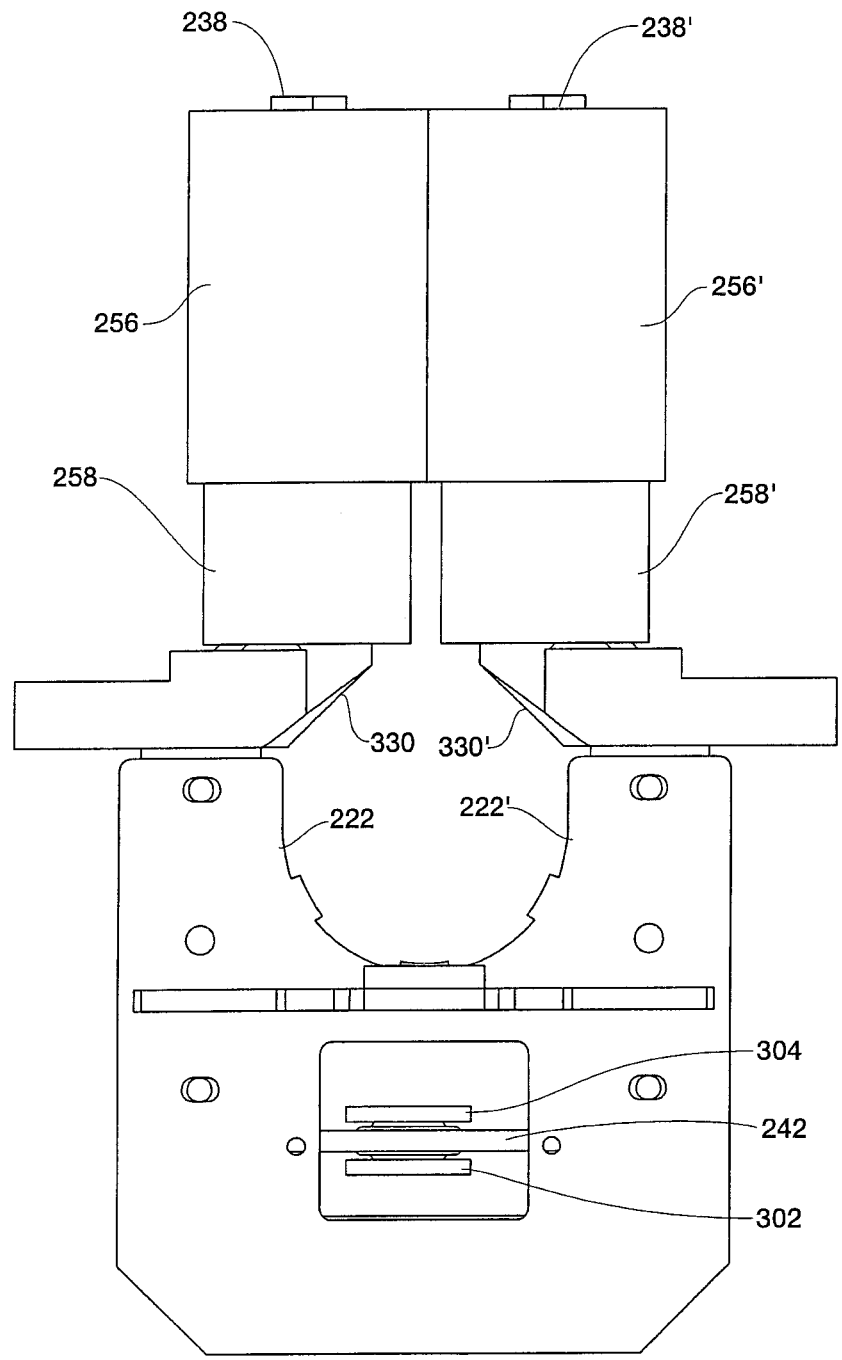
FIG. 14 is an enlarged side perspective view of an isolated opposed motor roller assembly, with elements omitted for clarity.

FIG. 14 illustrates an isolated, opposed motor roller assembly embodiment having second shafts 238, 238' which typically pass through the pivot block assemblies 330,330'. Each pivot block assembly 330,330' includes frictional surfaces 258, 258' at the end nearest the pivot block assemblies 330, 330' thereby engaging drive belts, including outer elastomeric surfaces 256, 256'. Further, at least one link may be affixed to one of the pivot block assemblies 330,330'. Similarly, a second link may be affixed to the other pivot block assembly 330,330'. For instance, as seen in FIG. 14, a first link 302 and a second link 304 may be positioned on the corresponding pivot block assemblies 330,330'. In some examples, first link 302 and/or a second link 304 may be motor adjustment links. Other examples include a variety of additional intermittent linkage.

Figure 15A:
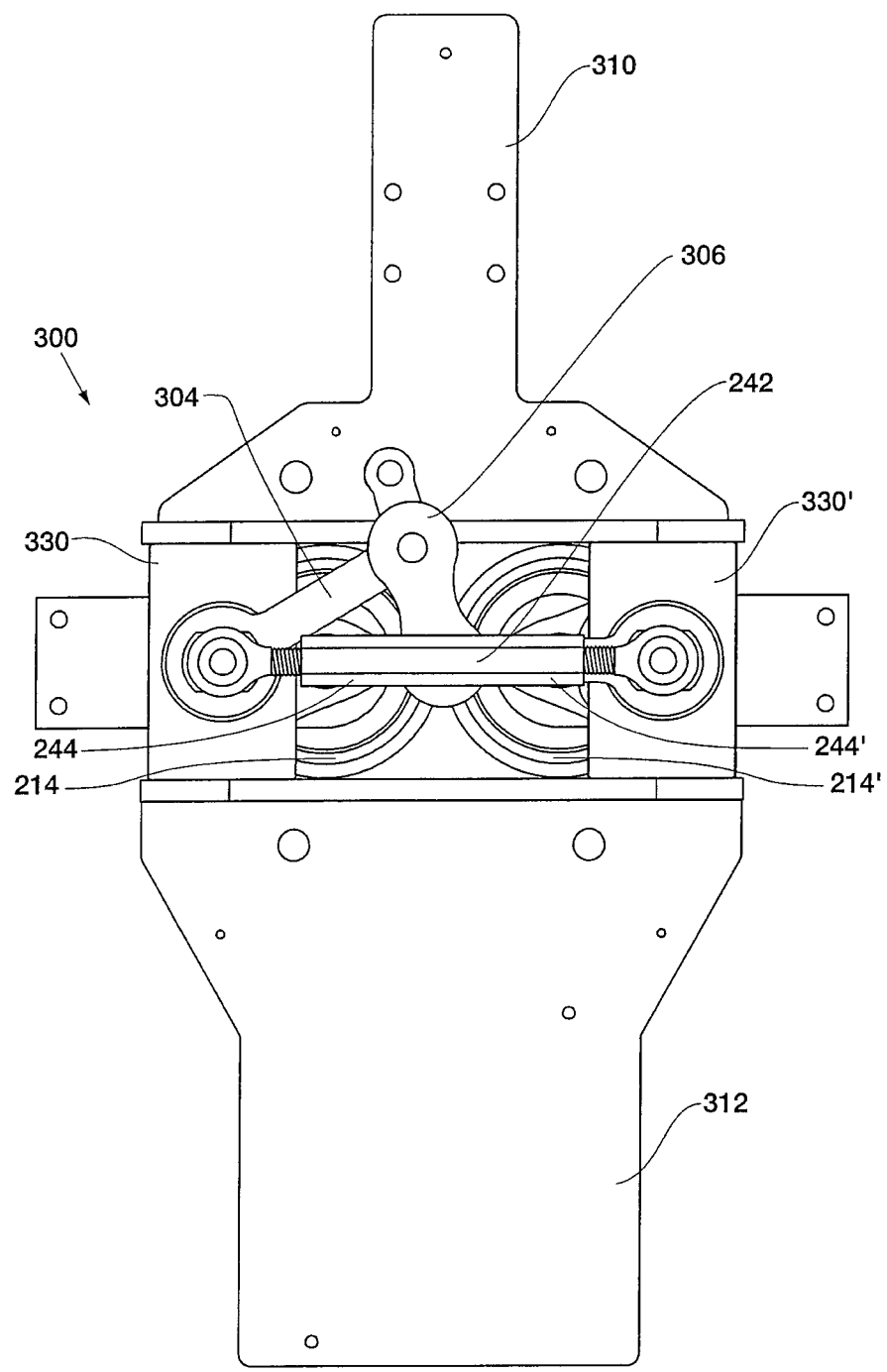
FIG. 15a is an enlarged bottom view of a self-tensioning adjustment assembly and opposed motor roller assembly, with elements omitted for clarity.

FIG. 15A shows one embodiment of self-tensioning adjustment assembly 300 and opposed motor roller assembly 210 in an operating position. Self-tensioning adjustment assembly 300 includes first link 302, second link 304 (see FIG. 15B) and connecting linkage to generally position the pair of pivot block assemblies, i.e. first pivot block assembly 330 and second pivot block assembly 300', in alignment with one-another. In yet other examples, the connecting linkage is a connecting roller link 306, thereby coupling at least one motor adjustment link to a second link, as shown in FIG. 15A.

Figure 15B:
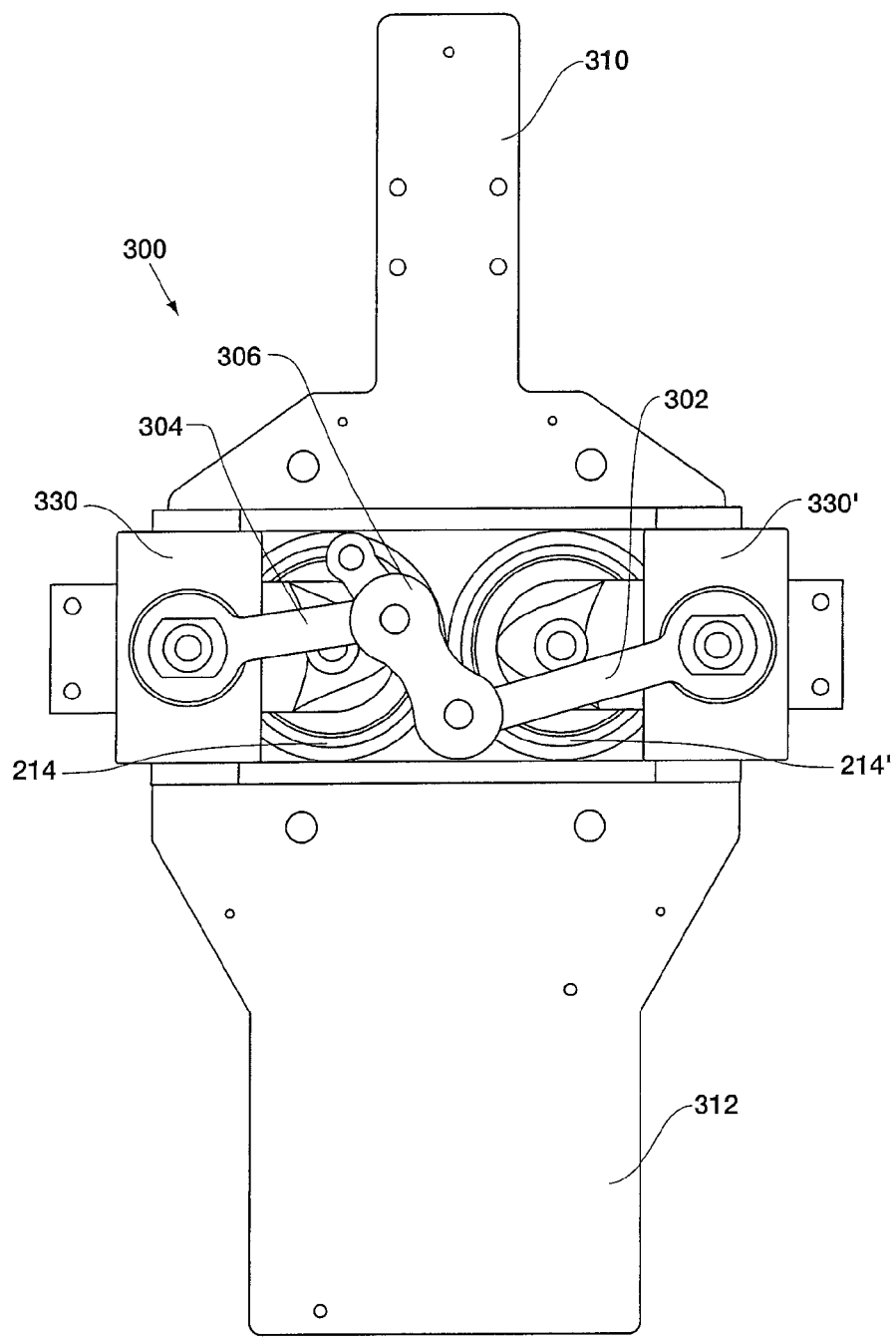
FIG. 15b is an enlarged bottom view of a self-tensioning adjustment assembly and opposed motor roller assembly, with elements omitted for clarity, in a second maintenance position.

FIG. 15B shows self-tensioning adjustment assembly 300 and opposed motor roller assembly 210 in one embodiment of a second, maintenance position. Here, first link 302, second link 304 and connecting roller link 306 tie movement of the pivot block assemblies, and associated rollers, together. As shown in this second, maintenance position, each pivot block assembly is positioned adjacent from a centerline (i.e. centered about the driven fin in an operating position) and one-anther simultaneously in a mirroring fashion. This second position may be beneficial for maintenance, assembly, reassembly or the like.

Figure 16:
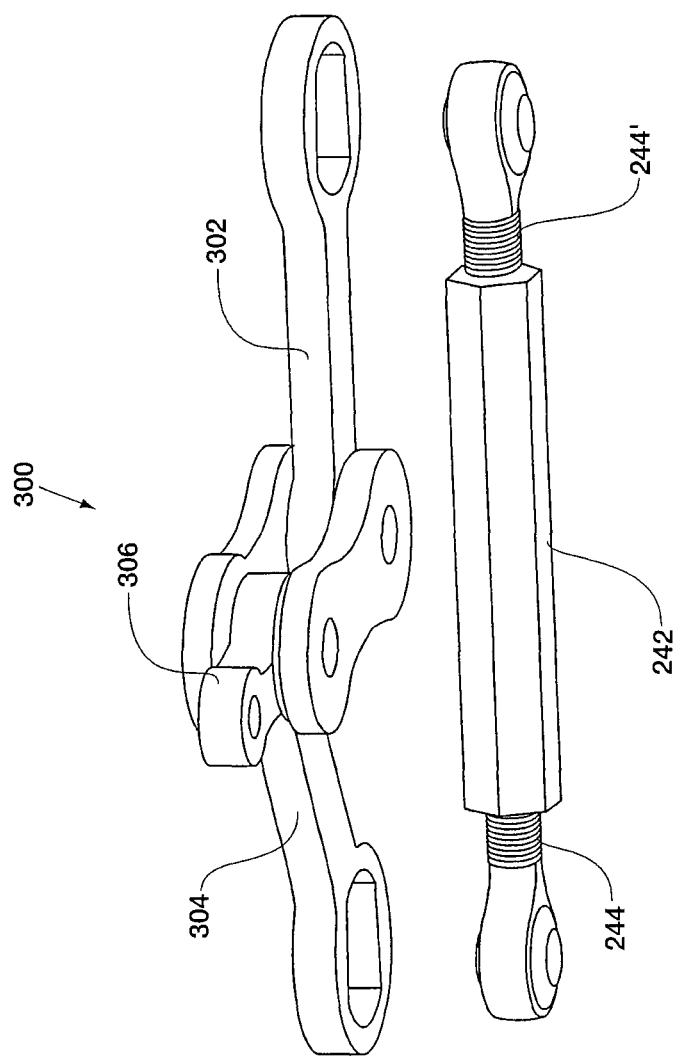
FIG. 16 is an enlarged side perspective view of isolated elements in the self-tensioning adjustment assembly, with elements omitted for clarity.

FIG. 16 better illustrates certain isolated elements in self-tensioning adjustment assembly 300. For instance, self-tensioning adjustment assembly 300 may include first link 302, second link 304 and connecting roller link 306 to couple the first link 302 second link 304 in a self-centering movement, so that movement of each pivot block assembly mirrors movement of the other pivot block assembly.

Figure 17:
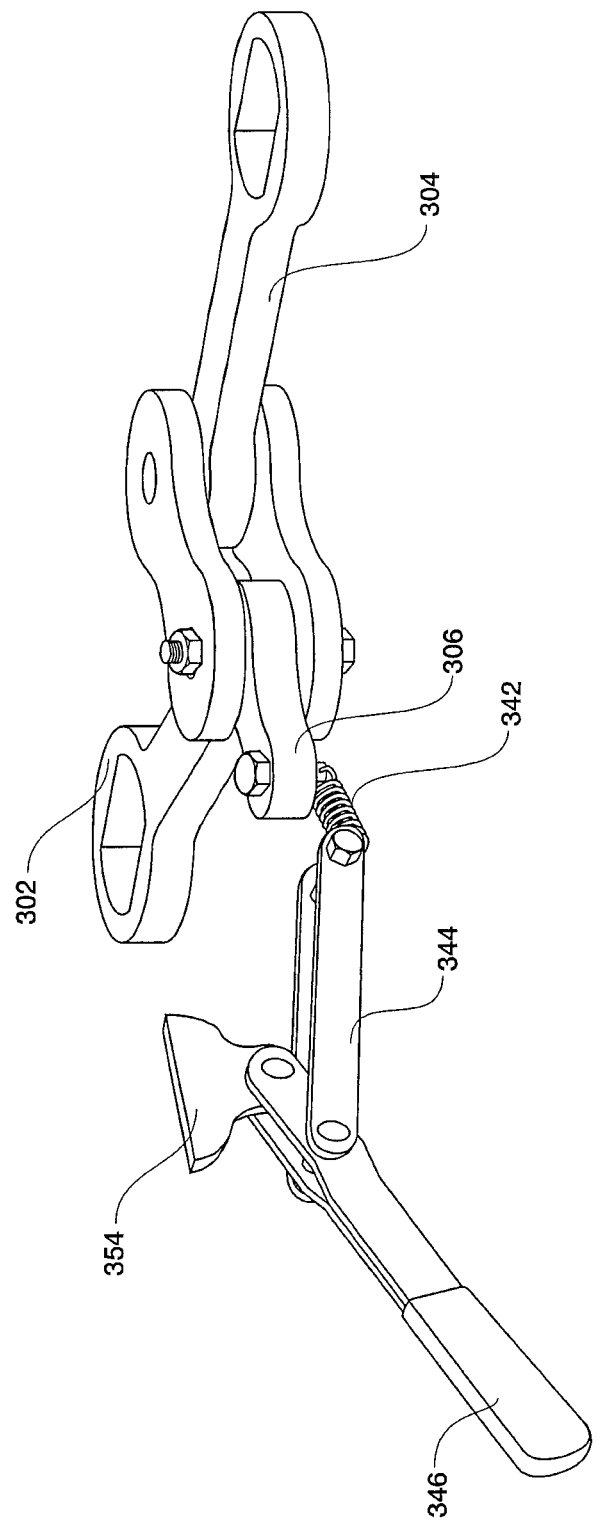
FIG. 17 is another enlarged side perspective view of isolated elements in the self-tensioning adjustment assembly, with elements omitted for clarity.

FIG. 17 further shows isolated elements in the self-tensioning adjustment assembly with additional lever assembly components. Here, lever 346 is connected to the self-tensioning adjustment assembly and is adapted to adjust pivot block assemblies 330,330'. For instance, lever 346 allows the system to mirror each pivot block assembly about the opposing pivot block assembly. Typically, a self-tensioning clamp plate (i.e. as shown in FIGS. 15A and 15B) supports lever 346. In some examples, the self-tensioning clamp plate includes a mounting bracket 354 connecting a proximate end of lever 346 to self-tensioning clamp plate 310. A lever retainer may affix lever 346 to self-tensioning clamp plate 310 to retain a distal handling end of lever 346 in an operating position. As shown in FIG. 17, coupling arm 344 may cantilever lever 346 and said connecting roller link 306. Further, a spring assembly 342 may position and connect coupling arm 344 and connecting roller link 306. Spring assembly 342 may include a spring coupled to self-tensioning clamp plate 310.

The drive roller assemblies 214, 214' are generally cylindrical and are made of aluminum or other light-weight alloy. They each have frictional surfaces 258, 258' at the end nearest the pivot block assemblies 330,330' for engaging drive belts 262, 262' and outer elastomeric surfaces 256, 256' of about ¼" thickness on most of the remainder of the surface. The frictional surface 258 is preferably a series of circumferential grooves that mate with the drive belt 262. The drive belt may be a poly v-belt. The outer elastomeric surface is preferably polyurethane with a durometer value (Shore Type A) between about 60 and about 90. A suitable roller may be an opposed drive roller made of a polyurethane, for instance a material to balance durability and performance (i.e., resistance to slippage) of the rollers in this application.

Figure 18:
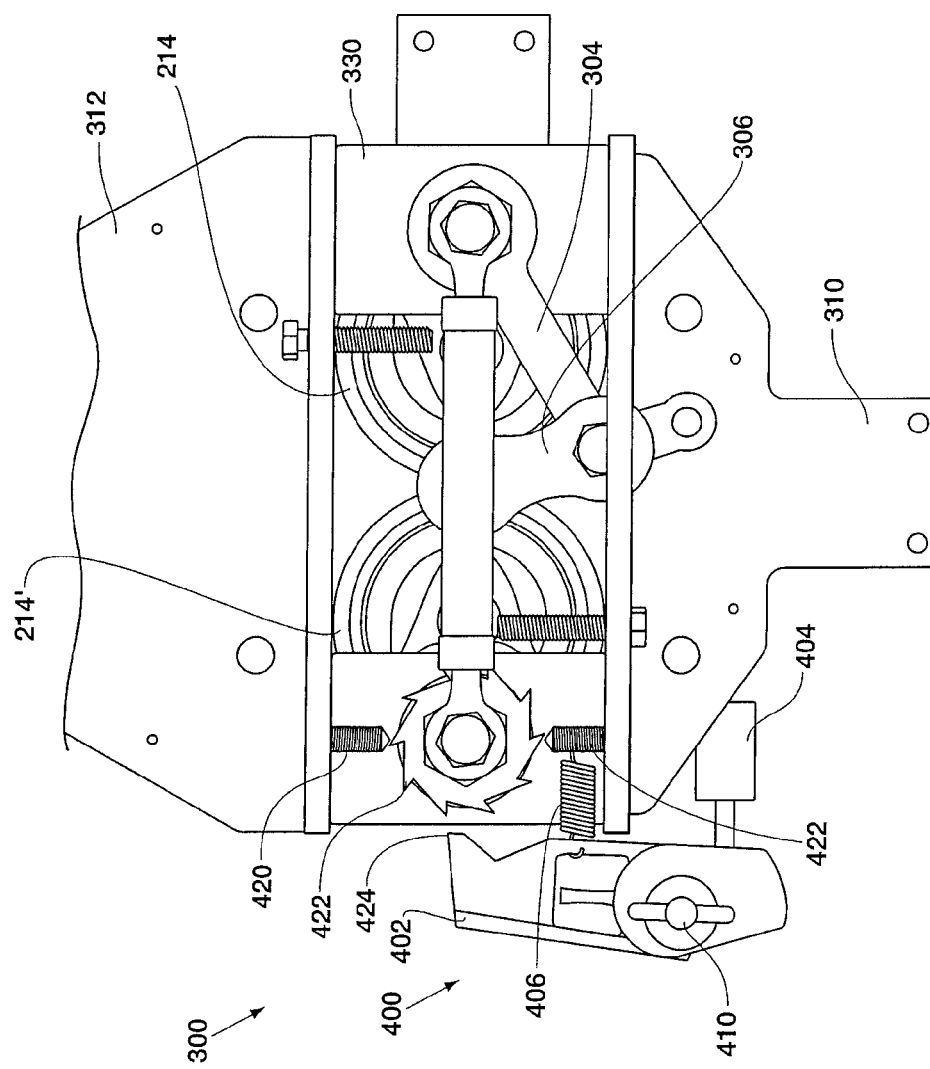
FIG. 18 is a bottom perspective view of one embodiment of an isolated braking assembly, with elements omitted for clarity.

FIG. 18 shows isolated elements of one embodiment of braking system 400 adjacent to the self-tensioning adjustment assembly 300. Braking system 400 may include braking body 402 being moveably cantilevered, or similarly connected, to self-tensioning adjustment assembly 300, for instance with at least one extension spring 406 as depicted in the illustration. As shown in FIG. 18, extension spring 406 is secured to self-tensioning adjustment assembly 300 via at least one retainer 420. Other embodiments of retainer 420 include a variety of sizes, styles and configurations so as to retain extension spring 406. Typically, braking body 402 may further include pivot point 410, through which braking body 402 may pivot, and/or rotate, toward sprocket 422 during a braking event. In some exemplary embodiments, braking body 402 may include paw 424, which is generally sized and shaped to pivot, and or similarly rotate, downward to contact sprocket 422 or similar linkage of braking system 400.

As shown in FIG. 18, solenoid 404 may be connected to braking body 402 to initiate pivot movement of braking body 402, e.g. to contact sprocket 422. In some embodiments, solenoid 404 may be an electrical solenoid, for instance a linear or a rotary solenoid. During a braking event, including, but not limited to an emergency braking event, solenoid 404 typically drops out, for instance paw 424 of braking body 402 engages sprocket 422, to prevent counterclockwise rotation of sprocket 422. Therefore, braking system 400 of self-tensioning adjustment assembly 300 may ratchet in only one direction, e.g. sprocket 422 may ratchet only in a clockwise rotation as illustrated in FIG. 18, thereby tightening grip on extended driven fin 36 to slow and/or stop the conveying system. In that respect, self-tensioning adjustment assembly 300 may not ratchet in the opposite direction, which would loosen the grip on extended driven fin 36. Other embodiments of braking system 400 include other configurations to increase tension, e.g. grip, on extended driven fin 36. For example, braking system 400 may generally include a linkage to engage a body that initiates clockwise rotation to exert pressure on the fin, thereby slowing the conveying system. Further, those of ordinary skill will appreciate the clockwise rotation orientation of the sprocket and other braking elements may be reversed and remain within the scope and spirit of the inventions herein.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A sorting conveyor for transporting objects and unloading objects at one or more unloading stations adjacent the conveyor, said sorting conveyor comprising:
    (a) a conveyor track;
    (b) a train of conveyor carts connected end-to-end; and
    (c) an opposed roller motor assembly for moving said conveyor carts on said conveyor track, said opposed roller motor assembly including a cantilevered, drive roller connected to one pivot block assembly and another pivot block assembly adapted for positioning said drive roller,
    wherein a tension linkage couples said pivot block assemblies together and movement of each pivot block assembly mirrors movement of the other pivot block assembly; and
    (d) each of said conveyor carts including:
        (i) a trailer frame base, including: a roller structure for engaging said conveyor track, a driven member responsive to said opposed roller motor assembly, adjacent spaced apart driven members, and a hitch mechanism for connecting each conveyor cart to an adjacent conveyor cart; and (ii) a carrying surface for holding the objects.

2. The apparatus according to claim 1, wherein said carrying surface is a carrying tray and each of said conveyor carts includes a tiltable support apparatus for supporting said carrying tray above said trailer frame base and for allowing tilting of said carrying surface towards at least one side of the conveyor to unload objects into unloading stations on at least one side of the conveyor.

3. The apparatus according to claim 2, wherein said tiltable support apparatus includes:
an upper support structure joined to said carrying tray, a lower support structure joined to said trailer frame base, and a pivot structure connecting the upper support structure to the lower support structure along a pivot axis; and
a tilting mechanism for tilting said carrying tray on said tiltable support apparatus to thereby unload objects into one of the unloading stations adjacent the conveyor,
wherein said tilting mechanism includes: a pair of actuating arms attached to said carrying tray on opposite sides of said tiltable support apparatus; and a pull-down mechanism associated with each unloading station for selectively pulling down one of said actuating arms so as to pull one side of said carrying tray downwardly into a tilted position;
wherein each of said actuator arms includes a cam follower on a lower end of said actuator arm, and wherein said pull-down mechanism includes a descending ramp adjacent said conveyor track, a laterally pivoting switch for directing the cam follower of a selected actuator arm into said descending ramp and an actuator connected to said laterally pivoting switch for opening said laterally pivoting switch so as to capture a selected cam follower and direct the cam follower into the descending ramp and for closing said laterally pivoting switch after capture of the cam follower and wherein said tilting mechanism further comprises a locking structure for locking said carrying tray in the tilted position upon pulling down of one of said actuating arms, and for locking said carrying tray in the upright position upon pushing up of said actuating arm.

4. The apparatus according to claim 3, wherein said actuating arms are each pivotally attached to said carrying tray beneath said carrying tray.

5. The apparatus according to claim 4, wherein the pivot axes of said actuating arms are parallel to the pivot axis of said tiltable support apparatus.

6. The apparatus according to claim 4, wherein said actuating arms are pivotally attached to said upper support structure of said tiltable support apparatus.

7. The apparatus according to claim 4, wherein the pivot axis of said pivot structure lies in a vertical plane parallel to the conveyor line of travel, and wherein said actuating arms remain substantially parallel to the vertical plane parallel to the conveyor line of travel during pulling down and pushing up of said actuating arms to tilt said carrier tray.

8. The apparatus according to claim 3, wherein said locking structure includes:
(a) a pair of laterally extending locking flanges on opposite sides of said tiltable support apparatus;
(b) a pair of locking blocks mounted to inner surfaces of said actuating arms, each locking block having locking channels that receive said locking flanges; and (c) a biasing member attached to both actuating arms for biasing said actuating arms towards each other so as to urge said each of said locking flanges into one of said locking channels.

9. The apparatus according to claim 8, wherein each locking block includes a locking channel associated with the tilted position of said carrying tray, and wherein each locking block includes a locking channel associated with the upright position of said carrying tray.

10. The apparatus according to claim 9, wherein each said locking flange includes a roller mounted to an outer edge thereof.

11. The apparatus according to claim 10, wherein each said locking block includes a cammed section between said locking channels over which said rollers on the outer edges of said locking flanges roll.

12. The apparatus according to claim 1, wherein said conveyor track comprises two parallel rails.

13. The apparatus according to claim 12, wherein said trailer frame base includes a longitudinal base member that extends between the two parallel rails parallel to the conveyor line of travel.

14. The apparatus according to claim 1, wherein the driven member of said trailer frame base comprises a fin moved in the conveyor line of travel by said opposed roller motor assembly.

15. The apparatus according to claim 14, wherein said opposed roller motor assembly and said metal fin are both vertically oriented beneath said trailer frame base.

16. The apparatus according to claim 15, wherein said metal fin is generally parallelogram-shaped with rearwardly angled front and rear edges.

17. The apparatus according to claim 14, wherein said opposed roller motor assembly comprises at least one drive roller and at least one opposing surface for off-setting the mechanical load of said drive roller.

18. The apparatus according to claim 1, wherein said hitch mechanism comprises a front hitch on a front end of said trailer frame base, a rear hitch on a rear end of said trailer frame base, and a hitch connector for connecting the front hitch of one conveyor cart to the rear hitch of an adjacent conveyor cart.

19. The apparatus according to claim 18, wherein the front hitch is disposed overtop of the rear hitch.

20. The apparatus according to claim 2, wherein said trailer frame base comprises an auxiliary cart connector for connecting each conveyor cart to an adjacent conveyor cart to prevent adjacent conveyor carts from separating upon failure of said hitch mechanism.

21. The apparatus according to claim 20, wherein said auxiliary cart connector comprises an electrically conductive cable connected at one end to said trailer frame base and at another end to a trailer frame base of an adjacent conveyor cart.

22. The apparatus according to claim 1, wherein said sorting conveyor includes at least one single-axis conveyor cart that comprises a tiltable support apparatus having a horizontal pivot axis that is disposed generally parallel to the conveyor line of travel.

23. The apparatus according to claim 3, wherein said actuator includes:
(a) an actuator arm having a first end and a second end, said pivot switch being connected to said first end of said actuator arm; and
(b) a bi-directional actuator attached to said actuator arm second end, whereby said rotary actuator assembly is operable to rotate said laterally pivoting switch to engage said cam follower and direct said cam follower of a selected actuator arm into said descending ramp.

24. The apparatus according to claim 23, wherein said bi-directional actuator includes a coil spring attached to said actuator arm second end to rotate said pivot switch to said closed position.

25. The apparatus according to claim 23, further including an outer clevis coaxially aligned around said actuator arm to protect said actuator arm.

26. The apparatus according to claim 25, wherein said actuator arm includes a roll pin extending substantially perpendicular from said actuator arm for connecting said actuator arm to said pivot switch and wherein said outer clevis includes an aperture, said aperture being sized to allow said roll pin to extend outward therefrom into said pivot switch.

27. The apparatus according to claim 23, wherein said bi-directional actuator is a brushless torque actuator.

28. The apparatus according to claim 1, wherein said spaced apart driven members have vertically overlapping edges.

\* \* \* \* \*

UNITED STATES PATENT AND TRADEMARK OFFICE
CERTIFICATE OF CORRECTION

| | | |
|---|---|---|
| PATENT NO. | : 9,067,743 B1 | Page 1 of 1 |
| APPLICATION NO. | : 14/336811 | |
| DATED | : June 30, 2015 | |
| INVENTOR(S) | : Sotelo et al. | |

It is certified that error appears in the above-identified patent and that said Letters Patent is hereby corrected as shown below:

Specification

In Column 5, line 37, there should be a "." after the word link

In Column 7, line 2, the word --anus-- should be "arms"

In Column 8, line 25, the word --anus-- should be "arms"

Signed and Sealed this
First Day of December, 2015

Michelle K. Lee
*Director of the United States Patent and Trademark Office*